(12) United States Patent
Liu et al.

(10) Patent No.: US 10,515,295 B2
(45) Date of Patent: Dec. 24, 2019

(54) FONT RECOGNITION USING TRIPLET LOSS NEURAL NETWORK TRAINING

(71) Applicant: Adobe Inc., San Jose, CA (US)

(72) Inventors: Yang Liu, Cambridge (GB); Zhaowen Wang, San Jose, CA (US); Hailin Jin, San Jose, CA (US)

(73) Assignee: Adobe Inc., San Josec, CA (US)

( * ) Notice: Subject to any disclaimer, the term of this patent is extended or adjusted under 35 U.S.C. 154(b) by 257 days.

(21) Appl. No.: 15/796,213

(22) Filed: Oct. 27, 2017

(65) Prior Publication Data
US 2019/0130231 A1 May 2, 2019

(51) Int. Cl.
*G06K 9/68* (2006.01)
*G06K 9/66* (2006.01)
*G06K 9/62* (2006.01)

(52) U.S. Cl.
CPC ......... *G06K 9/6828* (2013.01); *G06K 9/6272* (2013.01); *G06K 9/6277* (2013.01); *G06K 9/66* (2013.01); *G06K 2209/011* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,524,429 B2* | 12/2016 | Zhang | ............... | G06K 9/00442 |
| 9,824,269 B2* | 11/2017 | Zhang | ............... | G06K 9/00442 |
| 9,824,304 B2* | 11/2017 | Wang | ................ | G06K 9/6828 |
| 10,074,042 B2* | 9/2018 | Wang | ................ | G06K 9/6828 |
| 2009/0315892 A1* | 12/2009 | Hiramatsu | ........... | G06T 11/203 |
| | | | | 345/443 |
| 2016/0055374 A1* | 2/2016 | Zhang | ............... | G06K 9/00442 |
| | | | | 382/182 |
| 2017/0098138 A1* | 4/2017 | Wang | ................ | G06K 9/6257 |
| 2017/0098140 A1* | 4/2017 | Wang | ................ | G06K 9/6828 |
| 2017/0116474 A1* | 4/2017 | Zhang | ............... | G06K 9/00442 |
| 2018/0114097 A1* | 4/2018 | Wang | ................ | G06K 9/6257 |
| 2018/0239995 A1* | 8/2018 | Wang | ................ | G06K 9/6828 |

OTHER PUBLICATIONS

Sun, Yi, et al.; "Deep Learning Face Representation by Joint Identification-Verification," Advances in neural information processing systems; Cornell University Library online: arXiv.org > cs > arXiv:1406.4773v1; Jun. 18, 2014; pp. 1-9.

Cheng, De, et al; "Person Re-Identification by Multi-Channel Parts-Based CNN with Improved Triplet Loss Function"; Published in: Computer Vision and Pattern Recognition (CVPR), 2016 IEEE Conference on Computer Vision and Pattern Recognition; Date of Conference: Jun. 27-30, 2016; pp. 1335-1344.

* cited by examiner

*Primary Examiner* — Anand P Bhatnagar
(74) *Attorney, Agent, or Firm* — Keller Jolley Preece

(57) ABSTRACT

The present disclosure relates to a font recognition system that employs a multi-task learning framework to jointly improve font classification and remove negative side effects caused by intra-class variances of glyph content. For example, in one or more embodiments, the font recognition system can jointly train a font recognition neural network using a font classification loss model and triplet loss model to generate a deep learning neural network that provides improved font classifications. In addition, the font recognition system can employ the trained font recognition neural network to efficiently recognize fonts within input images as well as provide other suggested fonts.

20 Claims, 13 Drawing Sheets

FONT RECOGNITION USING TRIPLET LOSS NEURAL NETWORK TRAINING

BACKGROUND

Recent years have seen a rapid proliferation in the use of computing devices in the area of digital typography with respect to creating and editing electronic documents. Indeed, it is now commonplace for individuals and businesses to use digital typography to create customized webpages, e-mails, magazines, marketing materials, and other electronic documents utilizing desktop computers, laptop computers, mobile devices, tablets, smartphones, or other computing devices.

Digital typography includes the use of digital fonts. Recent years have also seen an increase in the type and variety of digital fonts utilized in electronic documents. For example, an electronic document can use digital fonts selected from a collection of thousands of digital fonts. Further, individuals can effortlessly find, access, and install additional digital fonts on a computing device to be used for creating electronic documents.

A major challenge that has arisen with the increase in the number of digital fonts is the capability to correctly detect and recognize digital fonts. For example, an individual sees a font in a document or image and desires to use the same font in an electronic document. As such, the font in the document or image must be correctly identified before the user can use it as a digital font. In general, the ability to detect and recognize digital fonts can greatly enhance an individual's experience when creating and editing electronic documents.

While some recent font classification systems have been developed to recognize fonts using machine-learning algorithms, these recent font classification systems still struggle in the area of intra-class variances within a class of digital fonts (e.g., variations between glyphs of the same font). While this problem exists with respect to glyphs (e.g., unique symbols that make up words) that use the Roman alphabet, the magnitude of the problem increases with other languages. To illustrate, the Roman alphabet uses 26 different glyphs while Japanese writing includes over 50,000 glyphs. Other languages also include thousands of glyphs.

As the number of glyphs increase, such as in the case of Japanese fonts, the number of intra-class variances within the glyph content likewise increases. In many cases, due to the number of glyphs, recent font classification systems do not represent each of the glyphs in a training dataset, which often causes inaccurate results. As another issue, particularly with Japanese Fonts, the visual difference between different Japanese writing types (e.g., Kanji and Kana) is significant and requires additional training samples to correctly recognize and classify fonts. In sum, even recent font classification systems fail to provide the level of generalization and accuracy needed to correctly identify Japanese fonts.

In addition, recent font classification systems that employ machine-learning algorithms to classify fonts require large amounts of memory and computational requirements. In particular, recent font classification systems require additional memory, processing resources, and time to converge a neural network to identify accurate font feature vectors. In addition, due to the additional requirements, recent font classification systems are often unstable. Further, because of these requirements, client devices, particularly mobile ones, cannot execute these neural networks.

These and other problems exist with regard to detecting and classifying digital fonts, and Japanese fonts in particular, using existing systems and methods.

SUMMARY

Embodiments of the present disclosure provide benefits and/or solve one or more of the foregoing or other problems in the art with systems, computer media, and methods for effectively recognizing digital fonts (or simply "fonts") using deep learning techniques trained using a triplet loss model. For example, the disclosed systems train a font recognition neural network using a triplet loss model to efficiently recognize a font from an input image to a known font. By employing the triplet loss model to train the font classification neural network, the disclosed systems can improve the performance of font classification as well as remove negative side effects caused by intra-class variances of glyph content.

More particularly, the disclosed systems generate font triplets from a training front set that includes text images of various fonts. A font triplet can include an anchor text image, a positive text image, and a negative text image. The anchor text image and the positive text image (e.g., a positive pair) share the same font but different text (e.g., glyphs). The anchor text image and the negative text image (e.g., a negative pair) share the same text but different fonts. The disclosed systems train the font recognition neural network by minimizing a triplet loss. In one or more embodiments, the triplet loss seeks to minimize the distance between feature vectors for positive pairs of text images while simultaneously increasing the distance between feature vectors for negative pairs of text images.

Once trained, the font recognition neural network can receive an input text image that includes an input font and determine a font probability vector for the input font. Further, the disclosed systems can identify the input font based on the probability vector.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
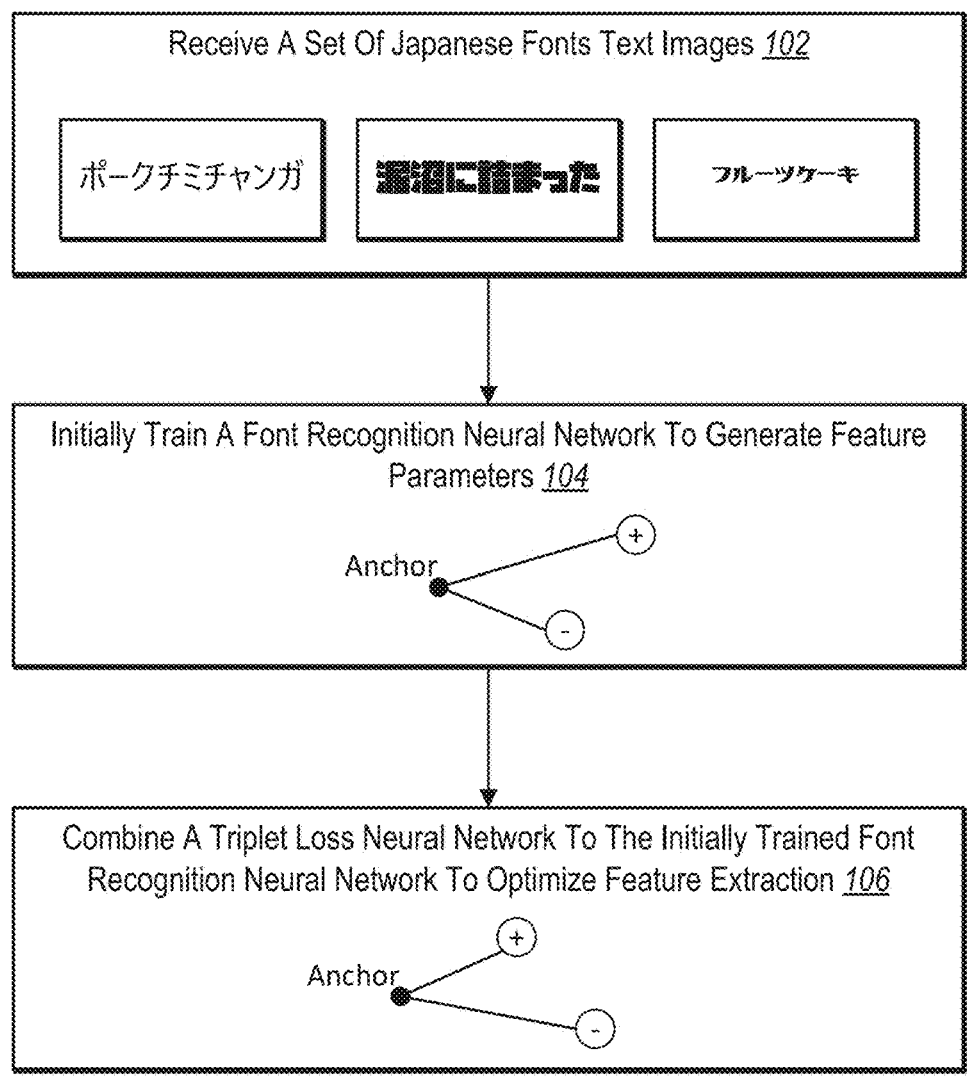
FIG. 1 illustrates a diagram of a general process for training a font recognition neural network using a triplet loss model in accordance with one or more embodiments.

This disclosure describes one or more embodiments of a font recognition system that employs a multi-task learning framework to improve font classification and remove negative side effects caused by intra-class variances of glyph content. In particular, the font recognition system trains a font recognition neural network using a triplet loss model to improve overall font recognition by removing the side effects form diverse glyph content.

To illustrate, in various embodiments, the font recognition system generates a font recognition neural network trained to classify fonts using a training font set of labeled text images. In addition, the font recognition system generates three duplicate feed-forward neural networks (e.g., a triplet neural network) that share parameters (e.g., lower layers and higher layers) with the font recognition neural network. The font recognition system further trains the font recognition neural network by jointly minimizing a triplet loss model from the triplet neural network and a font classification loss model from the font recognition neural network. The font classification loss model minimizes the distance between feature vectors of similar font classes. The triplet loss model minimizes the distance between feature vectors of positive pairs from a triplet of images text images while simultaneously increases the distance between feature vectors of negative pairs of triplet text images.

In one or more embodiments, the font recognition system trains an initial font recognition neural network using a font classification loss model (e.g., a softmax based classifier with a cross-entropy font classification loss model). The font recognition system adds a triplet neural network including three duplicates of the feed-forward neural network of the initial font recognition neural network. The triplet neural network and the initial font recognition neural network share parameters (i.e., they share the same lower layers for feature extraction and higher layers for font classification).

As mentioned, the font recognition system employs font triplets to train and refine the font recognition neural network. A font triplet includes a set of three images of text including as an anchor text image, a positive text image, and a negative text image. In addition, a font triplet includes a positive text image pair between the anchor text image and the positive text image, as well as a negative text image pair between the anchor text image and the negative text image.

The font recognition system uses the triplet neural network to train and refine the initial font recognition neural network based on the font triplets. In particular, as mentioned above, the font recognition system employs the font classification loss model (e.g., a softmax loss function) and the triplet loss model (e.g., a hinge loss function) to jointly train the font recognition neural network. The first feed-forward neural network processes an anchor text image within a font triplet, the second feed-forward neural network processes a positive text image within the font triplet, and the third feed-forward neural network processes a negative text image within the font triplet. The triplet loss model then uses theses outputs to train the neural network. In particular, the font recognition system employs end-to-end learning and back propagation to train and quickly converge the font recognition neural network. For example, upon detecting a font triplet that is incorrectly classified (e.g., the negative pair has a shorter distance than the positive pair in feature space), the triplet loss model employs back propagation to simultaneously update the parameters within the font recognition neural network.

To help generate a robust font recognition neural network that quickly converges, the font recognition system can intelligently generate the triplets used in training. In particular, rather than randomly selecting triplets, the font recognition system can use a hard-negative sampling strategy. In particular, the font recognition system can define a positive text image pair of a font triplet as a pair of fonts including the same font style but different between glyph content (e.g., words or text) with respect to the text within the images. The font recognition system can define a negative text image pair as a pair of fonts including the same glyph content but different fonts. In this manner, the triplet loss model favors a small distance between positive text image pairs having with the same font but different glyphs, and a large distance between negative text image pairs having the same glyphs but different fonts.

Additionally, in one or more embodiments, the font recognition system introduces random deviations into the text images of the fonts in the training font set. For example, the font recognition system randomly introduces a small amount of Gaussian noise, blur, or shading to various text images. In addition, the font recognition system rotates the perspective of randomly selected text images. By adding random deviations, the font recognition system can improve the robustness of the font recognition neural network by making training more challenging, and thus, making the trained font recognition neural network more discriminative (e.g., more selective) with generating font feature vectors.

The font recognition system uses the triplet-loss trained font recognition neural network to identify the font of text in input images. For example, in various embodiments, the font recognition system receives an input text image that includes an input font. Upon receiving the input text image, the font recognition system determines one or more font probability vectors for the input font using the triplet-loss trained font recognition neural network. Further, the font recognition system identifies the input font based on the determined font probability vectors.

Specifically, in various embodiments, the font recognition system employs the trained font recognition neural network to determine a font probability vector for the input text image. For instance, the font classifier generates a font probability vector that indicates a matching probability between the input font and each font in a set of known fonts, such that the font recognition system identifies the input font as the known font having the highest matching probability within the font probability vector. The font recognition system can identify known fonts with the next highest matching probabilities as similar fonts (e.g., top five matching fonts).

As previously mentioned, the font recognition system provides many advantages and benefits over conventional systems and methods. As an example, the font recognition system trains and identifies fonts (e.g., Japanese fonts) that traditionally suffer from side effects caused by intra-class variances of glyph content. In particular, by employing the triplet loss model in connection with the font classification loss model, the font recognition system trains a font recognition neural network that removes the side effects of intra-class variances of glyph content.

Further, as another example, in many embodiments, the font recognition system provides increased flexibility over known systems by accurately identifying text in input images not included in the training font set. In particular, as a result of removing the side effects caused by glyph content, the trained triplet-loss font recognition neural network becomes more generalized, which enables the font recognition system to accurately identify the font of glyphs unseen in the training stage. This is particularly advantageous when working with languages that have a large variety and number of possible glyphs (e.g., over 50,000 glyphs in the Japanese language).

As further described below, the font recognition system outperformed state-of-the-art font classifications systems in head-to-head evaluations with respect to accurately identifying fonts from text images. For instance, the font recognition outperformed state-of-the-art font classifications systems with respect to recognizing Kanji glyphs both seen and unseen in the training font set. In particular, the font recognition system provided a more generalized ability to recognize fonts as well as produced more accurate results. Additional results are described below with respect to FIG. 7 and FIG. 8.

As a further benefit, the font recognition system reduces memory needs and computational requirements over known systems. For example, the font recognition system reduces the overall training time by at least 20% by employing the triplet neural network when training the font recognition neural network. Stated differently, for a state-of-the-art font classifications system to achieve the same level of accuracy as the font recognition system disclosed herein, the system would require additional training iterations, training font data, and/or memory storage as well as additional time to converge a neural network to achieve comparable results as the font recognition system disclosed herein. Further, even with the increased time and resources, a state-of-the-art font classifications system would not produce a font recognition neural network that is as robust and stable as one or more embodiments described herein.

The following terms are provided for reference. As used herein, the term "text image" refers to any type of electronic document or file that includes written text (i.e., glyph content) in one or more digital fonts. For example, a text image can include an electronic document in the form of an image file (permanent or temporary), a clipboard file, a word-processing document, a portable document file (PDF), an e-mail file, a text file, a web page, or any other electronic file. A text image can originate from a physical source, such as an advertisement, brochure, flyer, book, magazine, periodical, or other publication.

As used herein, the term "digital font" (or simply "font") refers to a defined set of digital characters (e.g., glyphs). In particular, the term "font" includes a collection of digital characters of a particular style or typeface. A font includes digital files with the extensions, such as, but not limited to: .ttf, .otf, .fnt, .abf, .ttc, .suit, .woff, .vnf, .t65, .sfp, .sad, .pmt, .pfm, .pfb, .pfa, .odtff, .mf, .gdr, .fon, .fnt, .font, .etx, .eot, .compositefont, .acfm, .afm, or .amfm. For example, the term digital font includes fonts entitled Times New Roman, Helvetica, Arial, PT Sans Regular, Corbel, or other font titles.

A font can be represented by a font feature vector. As used herein, the term "font feature vector" (or simply "feature vector") refers to a vector of numeric values representing characteristics and attributes of a font. In particular, the term "feature vector" includes a set of values corresponding to latent and/or patent attributes and characteristics of a font. In one or more embodiments, a feature vector is a multi-dimensional dataset that represents a font. In one or more embodiments, a feature vector includes a set of numeric metrics learned by a machine-learning algorithm such as a neural network. For example, a feature vector can include font glyph data, such as glyph curvature, glyph spacing, glyph size, glyph shape, glyph width, glyph height, glyph location (e.g., glyph location in relation to a baseline), glyph area, glyph orientation, number of curves per glyph, arc length, glyph contrast, and font classification features (e.g., font features utilized to classify a font). Further, a feature vector can provide numeric values for the font class and font characteristics of a font.

As described above, feature vectors can provide a numerical representation of a font classification (i.e., font class), and font characteristics. As used herein, the term "font classification" refers to a font category and can include pre-defined categories utilized to classify digital fonts. For instance, font classifications include font classes (i.e., Serif, Sans Serif, Slab Serif, Script, Blackletter, Mono, Hand, or Decorative). In some embodiments, the term "font characteristic," also refers to attributes corresponding to a font, such as style (e.g., regular, bold, italic, shadowed, underlined, strikethrough, subscript, or superscript), weights (e.g., light, regular, and heavy weights), widths (e.g., condensed, regular, and extended widths), capitalization styles (e.g., all caps, small caps, title case, and sentence case), x-heights (e.g., small, regular and large x-heights), and contrasts (e.g., low, regular, and high contrasts).

The term "font probability vector" corresponds to a set of values that provide a correlation between an input font and known fonts. In particular, the term "font probability vector" includes an n-dimensional vector where n corresponds to a number of known fonts. For each of the n known fonts, the font probability vector includes a matching probability that the input font matches the known font. In some cases, a font classifier generates a font probability vector by comparing (e.g., based on vector space distance) the feature vector generated for an input font to feature vectors of each known font to determine the matching probability between the input font and the known font.

As used herein, the term "triplet" refers to a set of three items or objects (e.g., multi-dimensional data points) that compares the relative distance (i.e., similarity) of the first item in the triplet to the remaining two items. The term "font triplet" refers to a set of three fonts text images that comprise an anchor text image, a positive text image, and a negative text image. In one or more embodiments, within each font triplet, the anchor text image and the positive text image share the same font, but in different text, and the anchor text image and the negative text image share the same text, but written in different fonts. Stated differently, the positive pair includes the same font style but different glyph content (e.g., words or text) with respect to the text within the images. The negative pair includes the same glyph content but different font styles.

The term "machine learning," as used herein, refers to the process of constructing and implementing algorithms that can learn from and make predictions on data. In general, machine learning may operate by building models from example inputs (e.g., training), such as a training font set, to make data-driven predictions or decisions. In some example embodiments, machine learning is used for data mining, and statistical pattern recognition, such as collaborative feature learning, or learning features from a training font set.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"). In addition, a neural network is an algorithm (or set of algorithms) that implements deep learning techniques that utilize a set of algorithms to model high-level abstractions in data. As used herein, a neural network refers to a neural network having a regression loss model in the loss layer (e.g., a font classification loss model or a triplet loss model). The description and figures below generally refer to a CNN.

As used herein, the term "joint learning" refers to a machine-learning algorithm where multiple learning models are solved together. In particular, the term "joint learning" includes solving a plurality of learning tasks at the same time while utilizing the roles and constraints across the tasks. For example, the font recognition system can employ minimize multiple loss models simultaneously as part of a joint learning framework.

As used herein, the term "loss function" or "loss model" refers to a function that indicates loss errors between feature vectors and/or font probability vectors in multidimensional vector space. A machine-learning algorithm (e.g., neural network) can repetitively train to minimize the total overall loss. In some embodiments, the font recognition system employs multiple loss functions and minimizes the total loss between the two loss functions (e.g., Total loss=font classification loss+triplet loss). An example of a loss function includes font classification loss, which comprises a softmax classified with cross-entropy loss. Another example of a loss function includes a triplet loss, which comprises a hinge loss function that is used to train font classifiers based on font triplets and a fine parameter margin. Both the font classification loss and the triplet loss are further described below.

Referring now to the figures, FIG. 1 illustrates a diagram of a general process 100 for training a font recognition neural network in accordance with one or more embodiments. For instance, in one or more embodiments, a font recognition system implements the process 100 to train a font recognition neural network. The font recognition system can be located in one or more client devices, such as one or more server devices, one or more client devices, or a combination of server devices and client devices.

As an initial matter, the figures describe the font recognition system with respect to Japanese fonts. One will appreciate that the techniques, operations, methods, and actions described with respect to the font recognition system and the figures apply to other types of fonts, and in particular, fonts that suffer from intra-class variances of glyph content. Further, the actions techniques, operations, methods, and actions described herein can also relate to classifying and recognizing other types of images that traditionally exhibit intra-class variances.

As shown in FIG. 1, the font recognition system receives 102 a set of Japanese font text images. For example, the text images are part of a training font set. In one or more embodiments, the font recognition system generates the set of text images based on known fonts. In alternative embodiments, the font recognition system retrieves the set of text images from a local database or a remote source. In either of the embodiments, the font recognition system identifies the font depicted in each text image based on metadata associated with the text image, (e.g., a label, annotation, or tag).

Upon receiving the set of Japanese font text images, the font recognition system initially trains 104 a font recognition neural network to generate initial feature parameters. For example, in one or more embodiments, the font recognition system initially trains a font recognition neural network that employs a font classification loss model to establish extractions parameters used to generate feature vectors of fonts included in the text images. In some embodiments, the font recognition system trains a convolutional neural network with a softmax cross-entropy loss model. An example of the initially trained font recognition neural network is provided in FIG. 2A, described below.

The initially trained font recognition neural network can be regarded as the initialization phase of training a fully trained font recognition neural network. For example, the initially trained font recognition neural network includes spatial relationships between the various text images in the set of Japanese font text images. However, because Japanese fonts exhibit intra-class variances, the initially trained font recognition neural network may improperly map the spatial relationships between corresponding feature vectors. For instance, the initially trained font recognition neural network may group different fonts near each other when the corresponding text images share the same Japanese words or characters.

To remedy the intra-class variance issues, the font recognition system can add a triplet network to the initial font recognition neural network to significantly improve the training of the font recognition neural network. To illustrate, FIG. 1 shows the font recognition system also combining 106 a triplet neural network to the initially trained font recognition neural network to optimize training. In particular, the triplet neural network includes three duplicate feed-forward convolutional neural networks that use the parameters generated in the initially trained font recognition neural network (e.g., both the lower convolutional layers and higher fully-connected layers). In addition, the triplet neural network uses specifically-defined triplets as input to the feed-forward neural networks. Further, the training font set adds a triplet loss model that further improves the training of the font recognition neural network. An example of a triplet neural network is provided in FIG. 2B, described below.

By adding a triplet neural network, the font recognition system can significantly reduce, if not entirely remove, intra-class variances among glyph content with respect to the Japanese fonts. Indeed, the fully or triplet loss trained font recognition neural network learns new spatial relationships between the feature vectors that reduce the distance between fonts from the same font class and increase the distance between fonts from different font classes. To illustrate, FIG. 1 shows that positive font pairs (shown as the "+" symbol) are closer to the anchor font after combining the triplet neural network with respect to negative font pairs (shown as the "−" symbol). Further, because of the type of triplets used during training, the spatial relationships in the fully trained font recognition neural network groups font classes irrespective of glyph content. As a result, the fully trained font recognition neural network generalizes well to glyphs not seen in the training stage.

As mentioned above, FIGS. 2A and 2B illustrate a diagram of a more detailed process for jointly training the font recognition neural network. In particular, FIG. 2A shows initially training a font recognition neural network 201 using a font classification loss model, and FIG. 2B shows fully training the font recognition neural network 202 using font triplets, the font classification loss model, and a triplet loss model (e.g., via a triplet neural network).

Figure 2A:
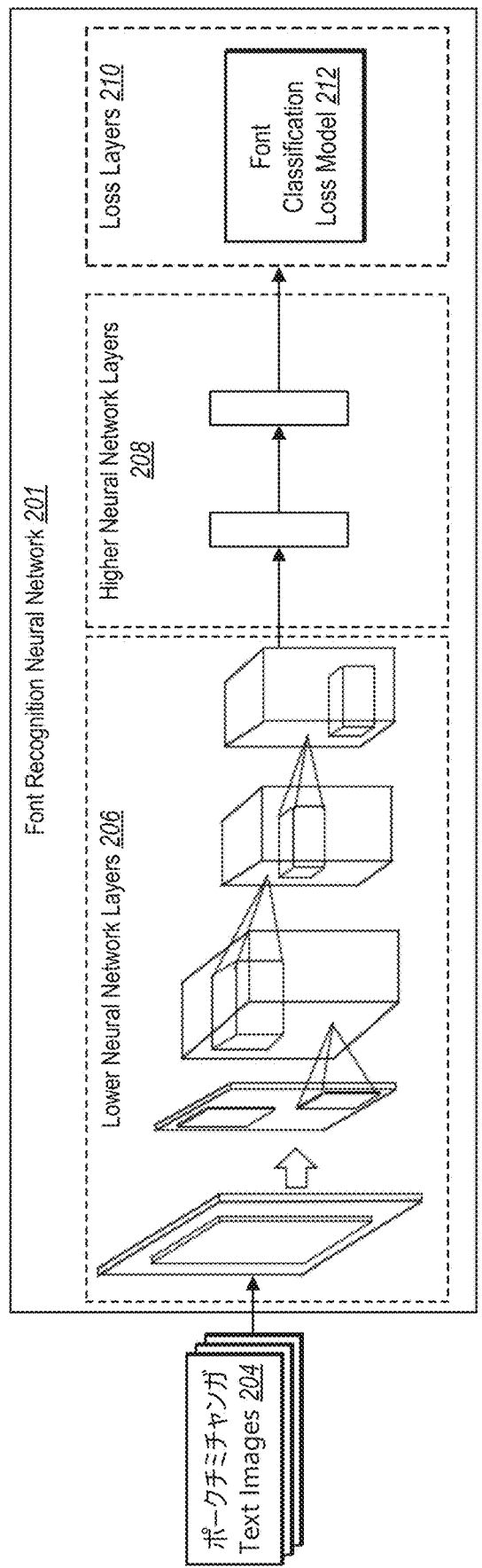
FIGS. 2A and 2B illustrate a diagram of a more detailed process for training the font recognition neural network using a triplet loss model in accordance with one or more embodiments.
Figure 2B:
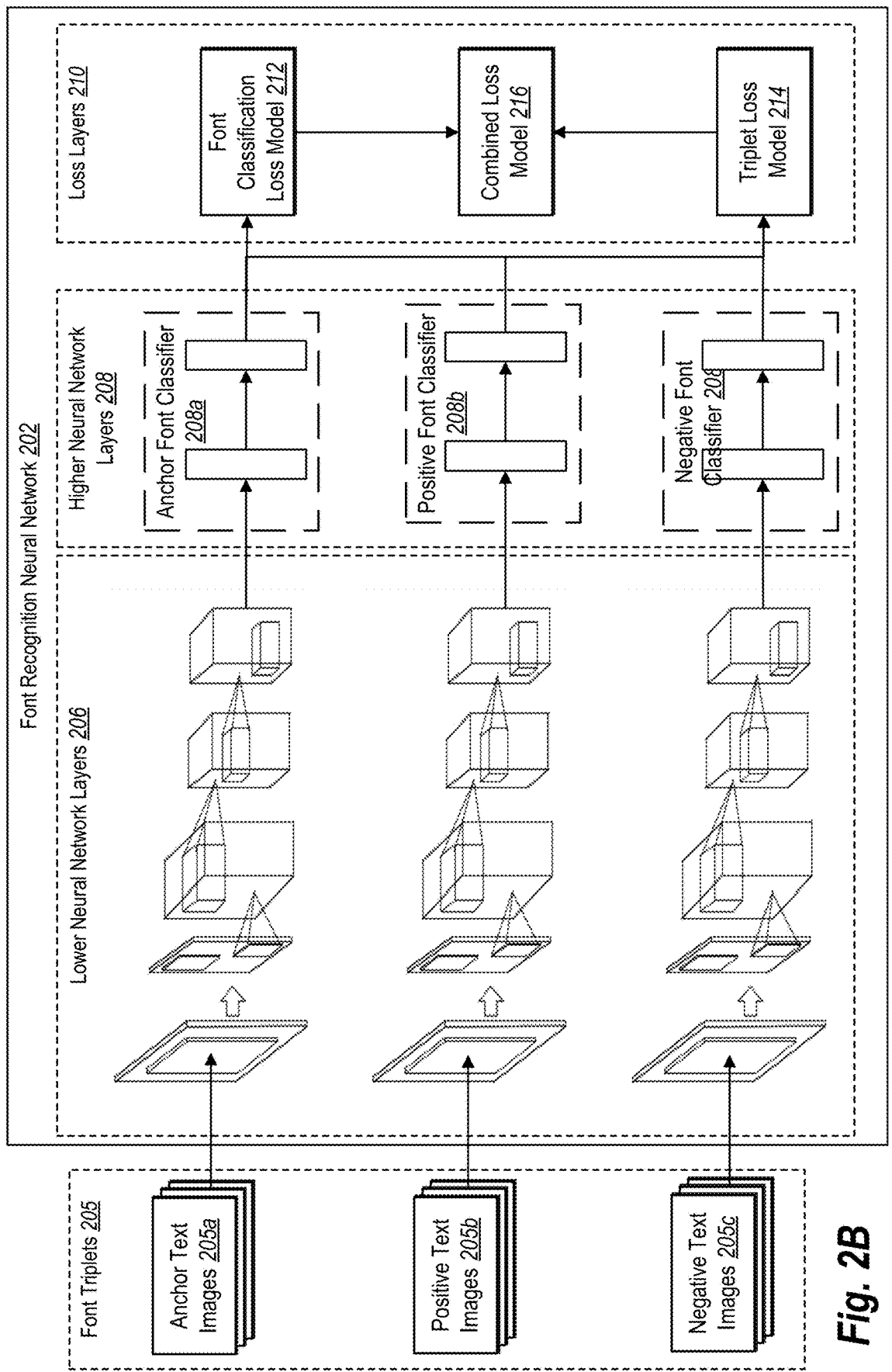

As just mentioned, FIG. 2A includes a font recognition neural network 201 trained using text images 204. The font recognition neural network 201 includes lower neural network layers 206, higher neural network layers 208, and loss layers 210. In various embodiments, the font recognition neural network 201 is a deep learning convolutional neural network. For example, the lower neural network layers 206 are convolutional layers (including one or more normalizing and pooling layers), the higher neural network layers 208 are fully-connected layers that include a font classifier.

As shown, the font recognition system receives a text image 204 of Japanese glyphs. Each of the text images 204 includes Japanese glyphs (e.g., characters, text, or words) in a font. Further, each of the text images 204 is labeled, annotated, or otherwise tagged with the font included in the text image.

In one or more embodiments, the font recognition system generates one or more of the text images 204. For instance, the font recognition system randomly pairs Japanese glyphs with fonts to create a large number of text images. To illustrate, the font recognition system randomly selects one or more Japanese glyphs. In some instances, the font recognition system selects one or more glyphs from a subset of the 5,000 (or another number) most used glyphs. For each randomly selected glyph(s), the font recognition system selects a font in which to render the glyph. For example, the font recognition system chooses one of 600 Japanese fonts in which to render the glyph(s). In some embodiments, the font recognition system generates millions of synthetic text images 204 that display the random glyphs/font combination.

In various embodiments, the font recognition system also introduces random deviations into the text images in the training font set. For example, the font recognition system randomly introduces noise (e.g., a small Gaussian noise with zero mean and a standard deviation of three), blur (e.g., a random Gaussian blur with standard deviation between two and four), perspective rotation (e.g., a randomly-parameterized affine transformation), and/or shading (e.g., random gradients that fill the input background). In addition, the font recognition system can add variable character spacing and/or variable aspect ratio modifications to the generated image. These deviations add robustness to the trained font recognition neural network as well as enable the trained font recognition neural network to better recognize real-world text images.

Using the text images 204, the font recognition system provides the image as input to initially train the font recognition neural network 201. For instance, in one or more embodiments, the font recognition system initially trains the font recognition neural network 201 using the text images 204. In particular, the font recognition system trains the lower neural network layers 206, one or more higher neural network layers 208, and/or loss layers 210 to generate feature weights and parameters that can be used to extract features from the text images 204, generate a mapping of feature vectors for each Japanese font, and generating font classification parameters that output font probability vectors.

As shown, the loss layers 210 include the font classification loss model 212. In one or more embodiments, the font classification loss model 212 is a softmax cross-entropy loss classifier that outputs extracted features of each font. In some embodiments, the softmax classifier determines extracted features of each font using mean square error computations. To illustrate by way of example, if 600 fonts are used in the text images 204, the font classification loss model 212 outputs a 600-dimensional probability feature vector with entries ranging between zero and one (i.e., [0-1]). In addition, the font recognition system can store each feature vector as part of the font recognition neural network 201 (e.g., in a font feature space).

Moreover, as part of training the neural network layers (i.e., the lower neural network layers 206 and the higher neural network layers 208), the font recognition system can also employ back propagation to better extract and learn feature vectors from the text image 204. For instance, in one or more embodiments, the font recognition system takes the feature vector output from the font classification loss model 212 and provides it back to the lower neural network layers 206 and/or the higher neural network layers 208 until the error loss from the font classification loss model 212 is minimized.

As mentioned above, the initially trained font recognition neural network 201 can provide front recommendations given an input text image of a Japanese font using an initial set of feature vectors and/or font probability vectors. However, the initially trained font recognition neural network 201 by itself may not produce accurate results for many types of fonts, such as Japanese fonts, which exhibit intra-class variances with glyph content. For example, the initially trained font recognition neural network 201 will likely misidentify the font of glyphs in a text image if one or more of the glyphs were not included in the text images 204 used in training.

To improve the font recognition neural network 201, as shown in FIG. 2B, the font recognition system further trains the font recognition neural network 201 using a triplet loss model. In particular, the font recognition system adds a triplet neural network that includes three duplicative feed-forward neural networks (or sets of parallel neural networks) that concurrently process inputs in the form of font triplets. By adding the triplet neural network, the font recognition system can further train the font recognition neural network 202 to extract font features that are not subject to the negative side effects of Japanese glyphs (i.e., intra-class variances).

As FIG. 2B illustrates, the triplet neural network includes a first feed-forward neural network that receives anchor text images 205a and an anchor font classifier) 208a within the higher neural network layers 208. The second feed-forward neural network receives positive text images 205b and includes a positive font classifier 208b within the higher neural network layers 208. The third feed-forward neural network receives negative text images 205c and includes a negative font classifier 208c within the higher neural network layers 208. One will appreciate that the anchor font classifier 208a, positive font classifier 208b, and negative font classifier 208c can be duplicates of each other (i.e., employ the same layers based on the initially trained font recognition neural network 201) and are called by different names for aid in description only.

In one or more embodiments, the font recognition system uses the initially trained font recognition neural network 201 to create the triplet neural network within the font recognition neural network 202. For instance, the font recognition system shares (e.g., re-uses) the feature extraction weights and parameters determined for the initially trained font recognition neural network 201. In particular, the font recognition system duplicates the shared feature extraction weights and parameters for each set of parallel feed-forward neural network layers (e.g., the lower neural network layers 206 and the higher neural network layers 208). In this manner, the font recognition system can significantly reduce determining new weights and parameters when further training the font recognition neural network 202, which results in reduced memory and computational needs.

Adding the triplet neural network to the initially trained font recognition neural network 201 enables the font recognition system to use font triplets 205 to further train the font recognition neural network 202. As mentioned above, a font triplet includes an anchor text image 205a, a positive text image 205b, and a negative text image 205c. For example, the positive text image 205b includes the same font as included in the anchor text image 205a, but written using different glyph content (e.g., different words or letters written in the same font). The negative text image 205c includes the same glyph content as included in the anchor text image 205a, but written using a different font (e.g., the same words or letters written in different fonts). Because of the purposely selected contrast in the font triplets between fonts and glyphs (e.g., it is not just a pairing of random glyphs and fonts), particularly in the negative text image pairing, the negative pairing is often called a "hard negative."

The font recognition system, in various embodiments, generates the font triplets 205. For example, in some embodiments, the font recognition system generates synthetic font triplets based on one or more images from the text images 204 of Japanese fonts that were used to initially train a font recognition neural network. In alternative embodiments, the font recognition system generates new text images to form font triplets. Additional detail regarding generating font triplets (including an example of a font triplet) is described below with respect to FIG. 3.

As shown in FIG. 2B, the font recognition system inputs font triplets 205 into the triplet neural network to train the font recognition neural network 202. In one or more embodiments, the font recognition system simultaneously inputs the anchor text image and corresponding positive and negative text images to the triplet neural network. In this manner, the font recognition system trains the font recognition neural network 202 to learn the relationships defined by the font triplets. Of note, while FIG. 2B shows the three duplicate feed-forward neural networks as separate networks, in one or more embodiments, the lower neural network layers 206 and/or higher neural network layers 208 form a single network that intermingles with each other (i.e., shares the lower layers).

For each inputted font triplet, the font recognition system outputs feature vectors from the higher neural network layers 208, which in turn are provided to the loss layers 210. As shown, the anchor font classifier) 208a provides output to the font classification loss model 212, as the font recognition system is training the font recognition neural network 202 to extract font feature vectors and font probability vectors from the anchor text images 205a (with respect to the other text images in the font triplets). Additionally, the anchor font classifier 208a, the positive font classifier 208b, and the negative font classifier 208c provide output to the triplet loss model 214.

The font classification loss model 212, in one or more embodiments, determines an amount of loss caused by errors in the training. For instance, the font classification loss model 212 employs the softmax classifier to identify when the feature vectors of two text images that share the same font are located beyond a threshold distance from each other when mapped in feature space. Upon determining the error loss, the font classification loss model 212 provides the error loss as feedback to the lower neural network layers 206 and/or higher neural network layers 208 via back propagation to decrease the distance between the feature vectors.

As previously mentioned, the font recognition neural network 202 also includes a triplet loss model 214. The triplet loss model 214 can determine the minimal distances between font triplets used to train the font recognition neural network 202. In some embodiments, the triplet loss model 214 provides feedback based on determined loss caused by errors in the training. For example, the triplet loss model 214 identifies a positive distance between feature vectors of the anchor text image 205a and the positive text image 205b and a negative distance between feature vectors of the anchor text image 205a and the negative text image 205c. The triplet loss model 214 can determine that an error is present when the positive distance is greater than the negative distance by a threshold (e.g., a predefined margin or tolerance). In feeding back the triplet loss, the triplet loss model 214 can determine if a future iteration of training improved or resolved the previously detected triplet loss. In this manner, the font recognition system employs the triplet loss model 214 to seeks to minimize the distance between feature vectors for positive pairs of text images while simultaneously increasing the distance between feature vectors for negative pairs of text images.

Further, to minimize overall loss to the font recognition neural network 202, in one or more embodiments, the font recognition system minimizes the joint loss between the font classification loss model 212 and the triplet loss model 214, shown as the combined loss model 216. For example, in some embodiments, the font classification loss model 212 and the triplet loss model 214 provide loss output to the combined loss model 216, which collectively determines an amount of loss caused by errors in training. The combined loss model 216 likewise provides feedback to the lower neural network layers 206 and/or higher neural network layers 208 via back propagation to improve the training of the font recognition neural network 202. The font recognition system can finish training when the joint loss to both the font classification loss model 212 and the triplet loss model 214 is at a minimum. Additional detail regarding the combined loss model 216 is provided below with respect to FIG. 4.

By providing feedback through back propagation, the font recognition system can jointly train the font recognition neural network 202 in an end-to-end manner. Accordingly, the font recognition system can enable the font recognition neural network 202 to quickly converge to an accurate and stable learned state. Indeed, because adding the triplet neural network reduces or eliminates intra-class variances among glyph content with respect to font classification, the font recognition system learns feature vectors for Japanese (or other) fonts that accurately identify the font for an input text image, even if the input text image includes glyphs not seen during training.

Figure 2C:
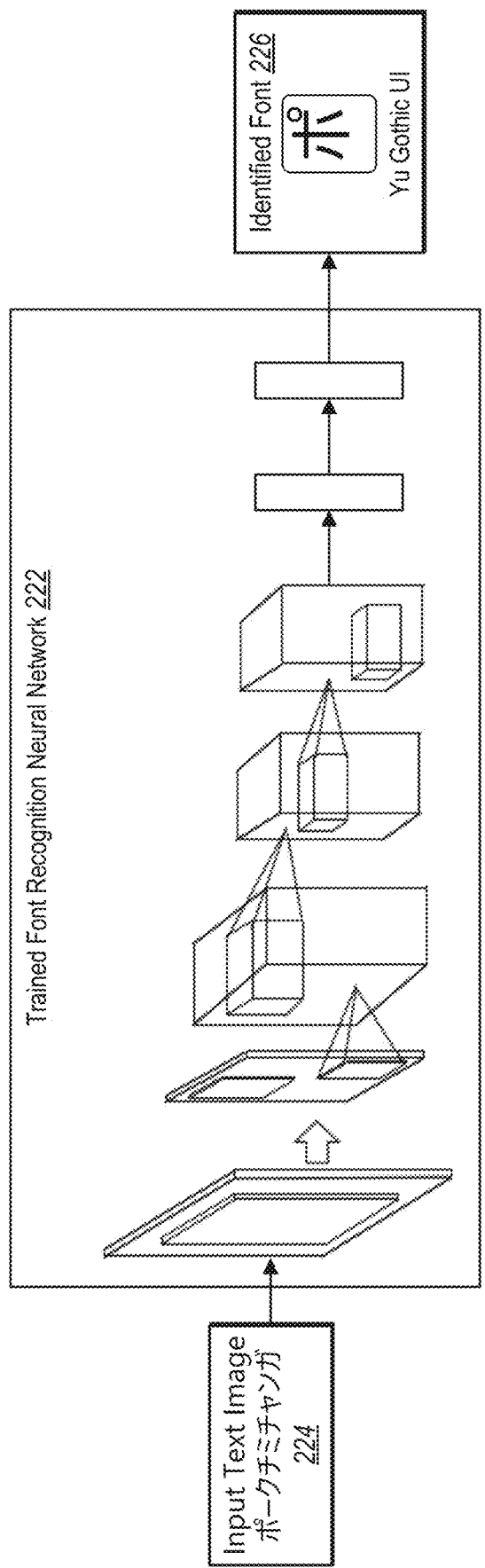
FIG. 2C illustrates a diagram of employing a trained font recognition neural network to identify a font within an input image in accordance with one or more embodiments.

To further illustrate, FIG. 2C shows a diagram of employing the trained font recognition neural network 222 to identify a font based on an input image in accordance with one or more embodiments. In particular, FIG. 2C shows the font recognition system determining an identified font 226 for text in an input text image 224 using the trained font recognition neural network 222.

As shown, the font recognition system obtains an input text image 224. For instance, the font recognition system detects a user's request to identify the font that was used in the input text image 224. For example, the font recognition system receives a copy of the input text image 224 within an application (e.g., a desktop or mobile application). The input text image 224 includes one or more glyphs written in a particular font. In some embodiments, the user provides a cropped selection of the glyphs within the input text image 224.

In response to receiving the input text image 224, the font recognition system determines one or more feature vectors for the input font of the text (i.e., glyphs) found within the input text image 224. In particular, the font recognition system uses the trained font recognition neural network 222 to extract the one or more feature vectors based on the input font. As described above, in some embodiments, the font recognition system can generate a multidimensional feature vector for the input font. As also described above, the trained font recognition neural network 222 was trained using by jointly minimizing a triplet loss and a font classification loss, where the triplet loss model seeks to minimize the distance between feature vectors for positive text images and feature vectors of anchor text images while simultaneously seeking to increase the distance between feature vectors for negative text images and the feature vectors of the anchor text images.

Using the determined feature vector, the font recognition system generates a font probability vector that identifies the identified font 226 of the input font. For instance, the font recognition system employs a font classifier to compare the feature vector of the input font to feature vectors of known fonts generated using the trained font recognition neural network to generate a font probability vector that indicates an identified font. Often, the feature vectors of the known fonts correspond to the fonts used to train the font recognition neural network 222 (e.g., the text images 204 described above). For example, if 600 fonts were used to generate the text images 204 and train the font recognition neural network 222, the font recognition system would compare the one or more feature vectors of the input font to feature vectors of the 600 fonts to generate a 600-dimensional font probability vector that indicates the probability that the input font matches each of the 600 known fonts. Using the font probability vector, the font recognition system identifies the identified font 226.

In addition, the feature vector determined for the input font will likely not perfectly match the feature vector of a known font (e.g., the distance between the two feature vectors will be greater than zero). Further, a known font can have multiple feature vectors, such as one feature vector for each time the known font appeared in a text image in the training font set and/or a font triplet. Accordingly, in some embodiments, the font recognition system compares the feature vector of the input font to the average feature representation (i.e., collecting of corresponding feature vectors for a font) of a known font when gendering a matching probability for the font. In particular, the font recognition system identifies the known font that has an average feature representation that is the smallest distance from the feature vector of the input font.

Upon determining the identified font 226, the font recognition system can present the identified font 226 to the user. For example, the font recognition system presents the identified font 226 to the user within a graphical user interface. In one or more embodiments, the font recognition system recreates the text in the input text image 224 using the identified font 226. In various embodiments, the font recognition system automatically applies the identified font 226 to a portion of text within an electronic document.

In some embodiments, the font recognition system determines that the user does not have the identified font 226 and assists the user in obtaining (e.g., downloading, purchasing, installing, or otherwise accessing) the identified font 226. In alternative embodiments, if the identified font 226 is too expensive to access, the font recognition system can provide a similar font to the user that is more economical.

Similarly, in one or more embodiments, the font recognition system also provides a list of similar fonts to the user. For example, the font recognition system identifies five fonts from the set of known fonts that are similar (e.g., based on matching probabilities indicated in the font probability vector) to the input font in the input text image 224. In some embodiments, when the font recognition system cannot identify the same font as the input font, the font recognition system provides the closest matching known font.

Figure 3:
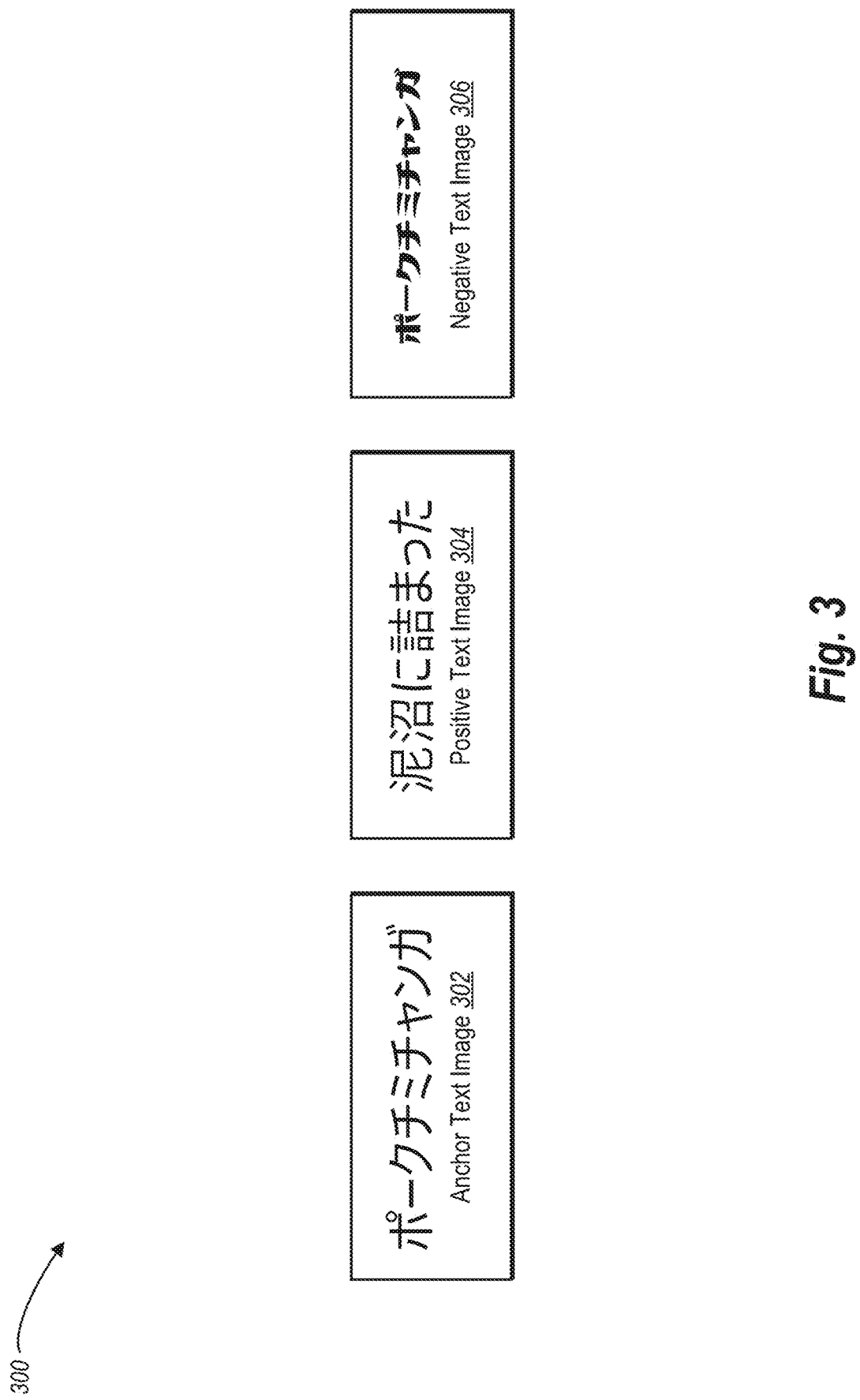
FIG. 3. illustrates an example of a font triplet in accordance with one or more embodiments.

FIG. 3 illustrates an example of a font triplet 300. As shown, the font triplet 300 includes three text images—namely an anchor text image 302, a positive text image 304, and a negative text image 306. The anchor text image 302 includes a first set of Japanese glyphs in a first font. The positive text image 304 includes a second set of Japanese glyphs also in the first font. Thus, while the second set of Japanese glyphs in the positive text image 304 differ from the first set of Japanese glyphs, both the first set of Japanese glyphs and the second set of Japanese glyphs are written using the same font (i.e., the first font). Within the font triplet 300, the anchor text image 302 and the positive text image 304 together form a positive text image pair (or simply positive pair).

As with the anchor text image 302, the negative text image 306 includes the first set of Japanese glyphs. However, unlike the anchor text image 302, the first set of Japanese glyphs in the negative text image 306 is written using a second font that is distinct from the first font. Within the font triplet 300, the anchor text image 302 and the negative text image 306 together form a negative text image pair (or simply negative pair).

As mentioned above, the font recognition system can generate font triplets. In one or more embodiments, the font recognition system selects two sets of glyphs and two fonts and generates a font triplet by creating an anchor text image, positive text image, and negative text image, as described above. In alternative embodiments, the font recognition system randomly generates the anchor text image 302 with a first set of Japanese glyphs written in a first font. The font recognition system then generates the positive text image 304 and the negative text image 306 based on the randomly generated anchor text image 302, as described above.

The process of selecting the font triplets is not trivial. If the font recognition system were to randomly select all the triplets such that the positive pair merely shared the same font and the negative pair had a different font from each other, many of the font triplets would be easily satisfied, and the font triplets would not cure the intra-class variance problems or allow for quick convergence during training. However, by employing a hard-negative sampling strategy that ensures that the set of Japanese glyphs within the positive pair are distinct and/or the set of Japanese glyphs within the negative pair match, the font recognition system can train a font recognition neural network to reduce, if not eliminate, intra-class variances within glyph content. In particular, this hard-negative sampling strategy causes the font recognition neural network to become more discriminative when extracting features, which leads to more distinct feature vectors. Further, as another benefit of employing hard negative font triplets, the font recognition system accelerates the learning/training process, which results in the font recognition neural network converging more quickly than previous systems.

As mentioned above, the font recognition system can select text images from the training font set (e.g., the input text images) used to initially train the font recognition neural network. Additionally, or alternatively, the font recognition system can generate font triplets using freshly generated text images. In one or more embodiments, the font recognition system generates multiple font triplets for the same anchor text image 302. In alternative embodiments, the font recognition system generates only one font triplet for each randomly generated anchor text image 302.

In one or more embodiments, the font recognition system introduces random deviations into the one or more text images of a font triplet. For example, the font recognition system randomly introduces a small amount of Gaussian noise, blur, or shading to a text image. In addition, the font recognition system occasionally rotates the perspective of a text image in a font triplet. As mentioned above, adding random deviations can improve the robustness of the font recognition neural network during training.

As mentioned above, the result of combining the triplet loss with the softmax loss of the initially trained font recognition neural network is that the distance between feature vectors of positive text image pairs in font triplets is smaller than that distance between feature vectors of negative text image pairs. Accordingly, as described above, the font recognition system uses end-to-end back-prorogation to fully train a font recognition neural network until the distance between positive pairs is smaller than the distance between negative pairs for font triplets. Additional detailed regarding the triplet neural network is provided below in FIG. 4.

Figure 4:
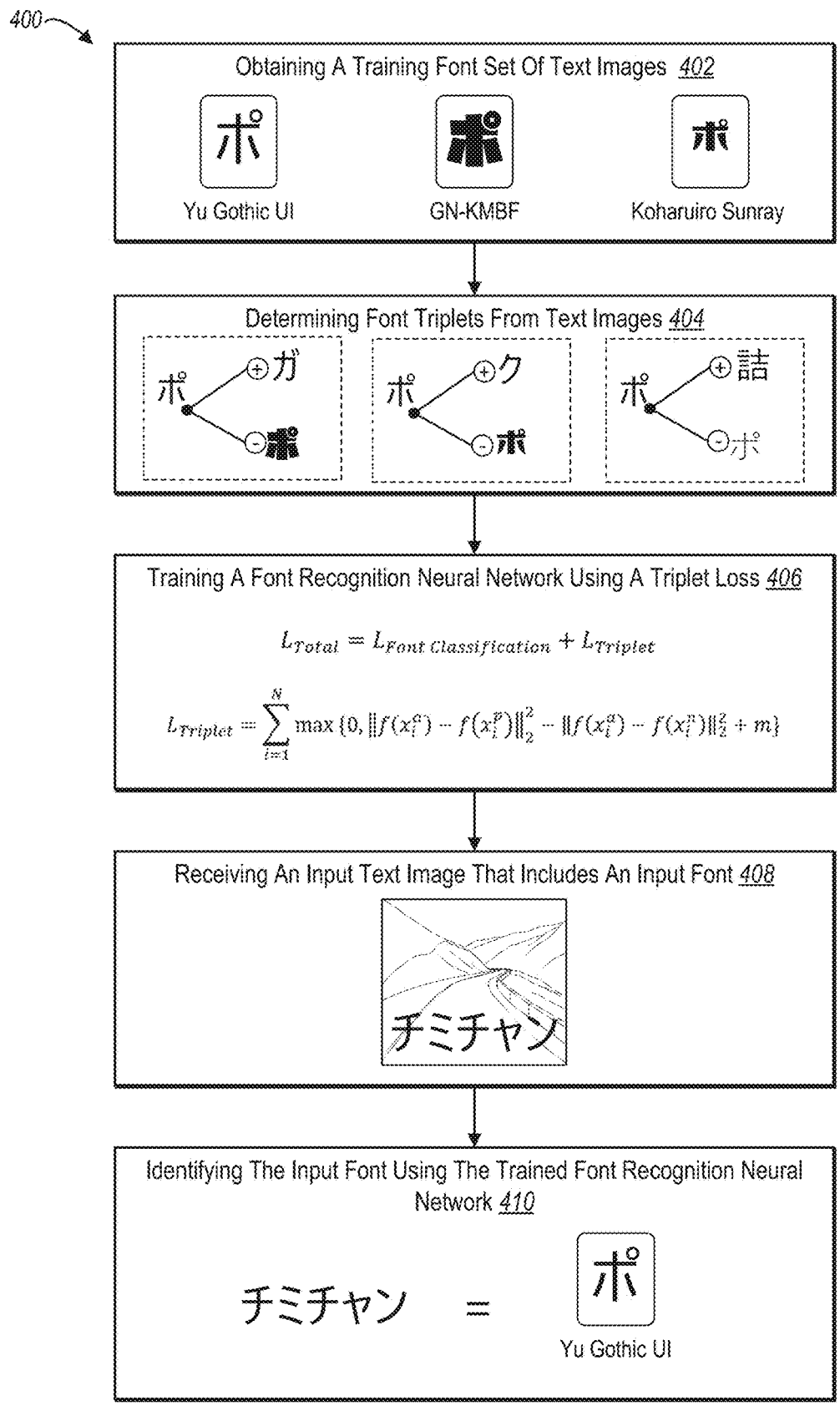
FIG. 4 illustrates acts in performing a step for determining triplets from text images that include various digital fonts as well as acts in performing a step for training a font recognition neural network using a triplet loss model in accordance with one or more embodiments.

FIG. 4, as mentioned above, illustrates a series of acts 400 in performing a step for determining a plurality of triplets from a plurality of text images as well as performing a step for training a font recognition neural network using a triplet loss. In various embodiments, the font recognition system described herein performs the series of acts 400. In some embodiments, the font recognition system is located on a server device and performs one or more of the series of acts 400 in connection with a client device.

As shown, the series of acts 400 includes obtaining 402 a training font set of text images. In some embodiments, the font recognition system identifies labeled text images that include glyphs and indicate the font used to render the glyphs. In one or more embodiments, the glyphs are in Japanese. In alternative embodiments, the glyphs correspond to a different language, as previously mentioned.

As explained earlier, the font recognition system can generate synthetic text images or otherwise obtain text images for the training font set. For instance, the font recognition system obtains the font triplets from an external source. Additionally, or alternatively, the font recognition system generates synthetic text images for the training font set. As described above, the font recognition system can generate millions of labeled text images for the training font set.

As FIG. 4 also illustrates, the series of acts 400 includes determining 404 font triplets from text images. In one or more embodiments, the images used to determine the font triplets are drawn from text images found in the training font set. In alternative embodiments, the images used to determine the font triplets are freshly generated or obtained from a separate source. In some embodiments, the font recognition system obtains some text images from the training font set and generates other text images to create font triplets.

As previously described, a font triplet includes an anchor text image, a positive image, and a negative text image. The font recognition system can generate a font triplet by selecting an anchor font text image. In one or more embodiments, the font recognition system selects the font text image by applying a randomly selected font to a string of one or more glyphs. Further, the font recognition system can save the text image of the glyphs as an image file.

Based on the selected anchor text file, the font recognition system can select the positive text image and the negative text image. For example, the font recognition system identifies or generates a positive text image that includes a string of one or more glyphs written in a different font than the anchor text image. Further, the font recognition system can verify that the one or more glyphs in the anchor text image do not match glyphs in the positive text image. Likewise, the font recognition system can identify or generate a negative text image that includes the same glyphs as the anchor text image, but written in a different font than the anchor text image.

In some embodiments, the font recognition system generates a font triplet by randomly selecting two fonts and two sets of glyphs. The font recognition system then generates the anchor text image with one of the first fonts and the first set of glyphs. Using the first font, but the second set of glyphs, the font recognition system generates the positive text image for the font triplet. Further, using the first set of glyphs and the second font, the font recognition system generates the negative text image for the font triplet.

As shown in FIG. 4, the series of acts 400 includes training 406 a font recognition neural network using a triplet loss, where the triplet loss is based on the font triplets. As described above, training a font recognition neural network can include initially train a convolutional neural network (e.g., the font recognition neural network) using a font classification loss function (i.e., font classification loss model) to obtain initial parameters for font feature extraction (e.g., weight parameters), then further training the convolutional neural network using a triplet neural network that employs the initial parameters for font feature extraction as a foundation. As mentioned above, by using the initial parameters for the triplet neural network, the font recognition system significantly reduces the time and resources needed to further train the font recognition neural network.

As part of employing the triplet neural network to train the font recognition neural network, the font recognition system adds three duplicate feed-forward neural networks that receive the font triplets as input. For example, a font triplet provides the anchor text image, the positive text image, and the negative text image to the triplet neural network. In response, the font recognition system trains the font recognition neural network to learn the relationship between feature vectors of the text images in the font triplet. Specifically, the font recognition system trains the font recognition neural network to map a positive distance between feature vectors for the anchor text image and the positive text image closer together than a negative distance between feature vectors for the anchor text image and the negative text image.

Adding the triplet neural network, which includes the triplet loss function, to the font classification function generates a multi-task learning framework to jointly improve the font classification performance and remove negative side effects caused by intra-class variances of the glyph content. To illustrate, combining the font classification loss function and the triplet loss function combine to create the following overall objective function:

$$L_{Total} = L_{Font\ Classification} + L_{Triplet} \quad (1)$$

In Equation 1, L indicates the overall combined total loss, $L_{Font\ Classification}$ indicates loss from the font classification loss function and $L_{Triplet}$ indicates loss from the triplet loss function.

In one or more embodiments, the font recognition system can employ a softmax cross-entropy loss classifier for $L_{Font\ Classification}$. For example, the font recognition system employs mean square error (MSE) to determine the font classification loss. In alternative embodiments, the font recognition system employs a different type of classifier that likewise outputs extracted feature vectors, where each of the outputted feature vectors indicates different fonts.

$$\|f(x_i^a) - f(x_i^p)\|_2^2 + m < \|f(x_i^a) - f(x_i^n)\|_2^2 \quad (2)$$

In Equation 2, $x_i^a$ represents the anchor text image in a font triplet, $x_i^p$ represents the positive text image in the font triplet, and $x_i^n$ represents the negative text image in the font triplet. In addition, f represents the function used to extract the font features from text images. Further, m represents a fine parameter that indicates the marginal distance enforced between positive and negative pairs. In one or more embodiments, the margin is manually set. In alternative embodiments, the font recognition system automatically sets and/or adjusts the margin based on the size of the feature space, the number of text images and/or fonts in the training font set.

Equation 2 provides the absolute value positive distance (or positive distance) between the positive pair in a font triplet (e.g., between feature vectors of the anchor text image and the positive text image) as well as the absolute value negative distance (or negative distance) between the negative pair in the font triplet (e.g., between feature vectors of the anchor text image and the negative text image). When the positive distance is smaller than the negative distance by at least the margin, the font triplet does not create any error loss. In other words, when the positive text image is located closer to the anchor text image than the negative is located to the anchor text image in font feature space (by at least the margin), the mapping of the feature vectors corresponding to the anchor text image, positive text image, and negative text image is well satisfied.

However, if the negative text image is closer to the anchor text image than is the positive text image (e.g., the negative distance is smaller than the positive distance), or if the positive text image is closer but not by the threshold amount specified by the margin, the font triplet feature vector mapping is not well satisfied. Thus, if Equation 2 is false, the font recognition system can provide the loss error information back to the font recognition neural network to further train the font recognition neural network. In particular, the font recognition system provides the amount of error loss as shown in the following hinge loss function:

$$L_{Triplet} = \sum_{i=1}^{N} \max\{0, \|f(x_i^a) - f(x_i^p)\|_2^2 - \|f(x_i^a) - f(x_i^n)\|_2^2 + m\} \quad (3)$$

As shown in Equation 3, the hinge loss function is closely based on Equation 2. For example, Equation 3 rewrites Equation 2 into a loss function. The triplet loss function (i.e., $L_{Triplet}$) of Equation 3 takes the maximum between zero (0) and the error loss of each font triplet. As mentioned above, error loss occurs when the negative distance in a font triplet is shorter than the positive distance by at least the margin.

Stated differently, when a triplet is optimally mapped (e.g., well satisfied), the positive distance will be smaller than the negative distance by at least the margin. As a result, the error loss will be a negative number. In this case, the font recognition system will select zero, as zero is the larger (i.e., maximum) of the two numbers. Conversely, if the font triplet is not well satisfied, then the maximum will be the remaining length that the negative distance is longer than the positive distance minus the margin. In this case, the font recognition system will add the remaining length to the total triplet error loss.

The font recognition system can feedback (e.g., back propagate) the total triplet error loss back into the font recognition neural network during training. By feeding back the triplet error loss, the font recognition system attempts to decrease the positive distance while increasing the negative distance of font triplets until the font triplets are well satisfied. In particular, the font recognition system can simultaneously train all three feed-forward neural networks using the feedback data. Similarly, the font recognition system also feeds back the total font classification loss into the font recognition neural network.

The font recognition system can repeat the process (i.e., train the font recognition neural network) until the total combined loss (i.e., Equation 1) between the font classification loss and the triplet loss is minimized. In some cases, minimizing the total combined loss does not result in the optimal font classification loss or optimal triplet loss, but rather results in the optimal joint loss between the two loss models when jointly trained.

FIG. 4 also shows acts in an algorithm for performing a step for identifying the input digital font using the trained font recognition neural network. As shown in FIG. 4, the series of acts 400 includes receiving 408 an input text image that includes an input font. For example, a user provides an image to the font recognition system that includes text written in an unknown input font. In some embodiments, the input text image can be a flat image file with no metadata and the font recognition system identifies an area of the input image that includes the unknown input font. In another example, the font recognition system automatically receives the text input file with the input font, such as part of a batch operation to identify fonts in text images.

As shown in FIG. 4, the series of acts 400 includes identifying 410 the input font from the input text image using the font recognition neural network. For example, the font recognition system provides the input text image with the input font to the trained font recognition neural network. In response, the font recognition neural network determines a feature vector and a font probability vector for the input font. In addition, as explained earlier, the font recognition system identifies the input font by based on the font probability vector.

In one or more embodiments, the font recognition system identifies the input font on a server device. For example, a client device provides the input text image (or representative data) to the server device, and the server device provides the identified input font back to the client device. In alternative embodiments, the font recognition system resided, at least in part, on a client device and/or font probability vectors identifies feature vectors for input text images as well as identifies the input fonts on the client device (e.g., a server device provides the trained font recognition neural network to the client device).

Moreover, in one or more embodiments, the font recognition system functions in connection with an application to receive and identify the font in the input text image. For example, a user is using a word-processing or graphic design application and requests to use the font displayed in the input text image. In response, the font recognition system identifies the input font in the input text image using the font recognition neural network and provides the identified font back to the user within the application. Further, in some embodiments, the font recognition system also provides additional similar fonts, as described above.

Figure 5:
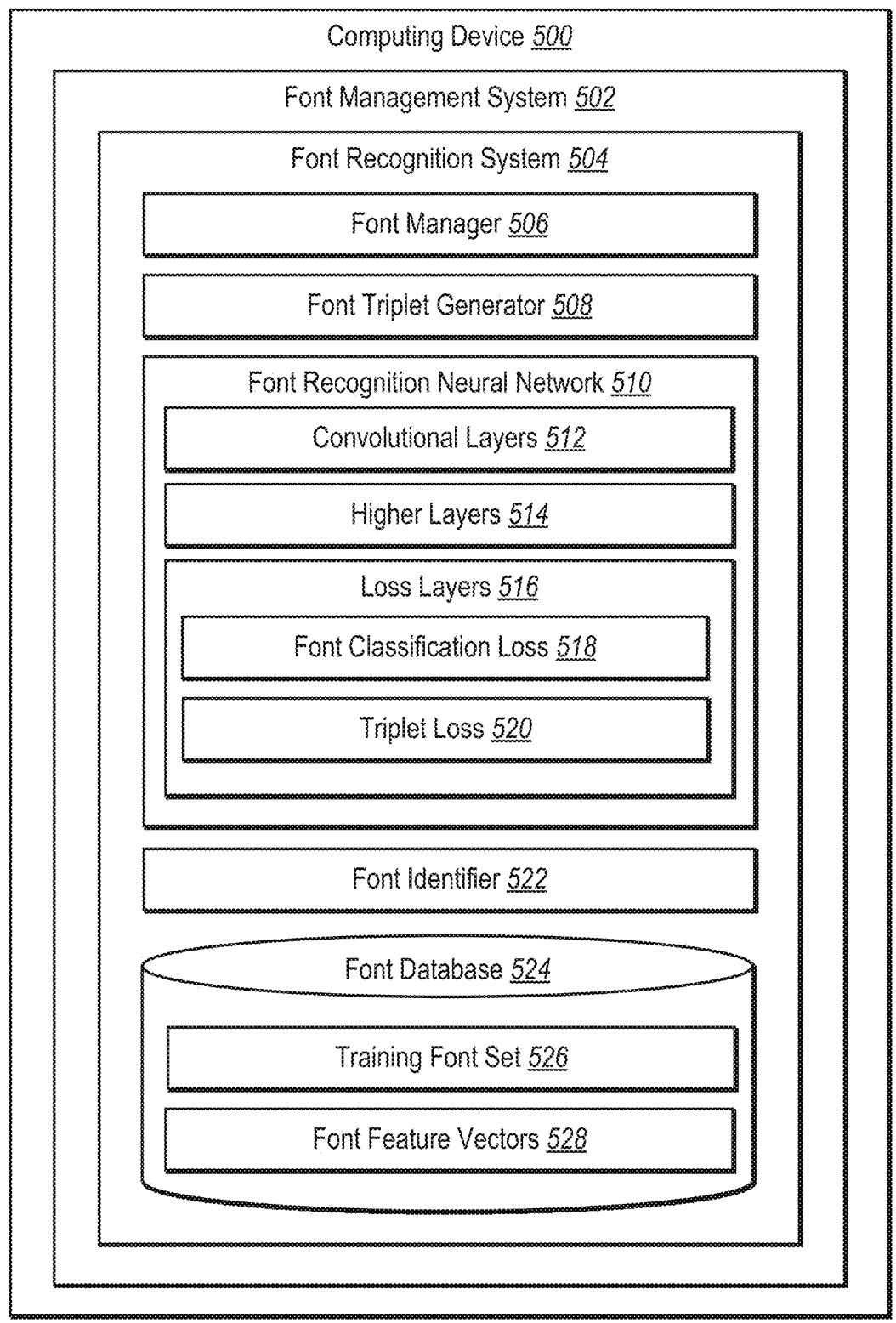
FIG. 5 illustrates a schematic diagram of a font recognition system in accordance with one or more embodiments.

Referring now to FIG. 5, additional detail will be provided regarding capabilities and components of the font recognition system in accordance with one or more embodiments. In particular, FIG. 5 shows a schematic diagram of an example architecture of the font recognition system 504 located within a font management system 502 and hosted on a computing device 500. The font recognition system 504 can represent one or more embodiments of the font recognition system described previously.

As shown, the font recognition system 504 is located on a computing device 500 within a font management system 502. In general, the computing device 500 may represent various types of client devices. For example, in some embodiments, the client is a mobile device, such as a mobile telephone, a smartphone, a PDA, a tablet, a laptop, etc. In other embodiments, the computing device 500 is a non-mobile device, such as a desktop or server, or another type of client device. In some embodiments, portions of the computing device 500 correspond to computing devices of different types (e.g., some components operate on the computing device 500 when acting as a server device and some components operate on the computing device 500 when acting as a client device). Additional details with regard to the computing device 500 are discussed below as well as with respect to FIG. 11.

The font management system 502, in general, facilitates the creation, modification, sharing, installation, and/or deletion of digital fonts within electronic documents and/or system applications. For example, the font management system 502 stores a repository of fonts on the computing device 500, such as in the font database 524. In addition, the font management system 502 can access additional fonts located remotely. Further, in some embodiments, the font management system 502 can be located separately from the computing device 500 and provide fonts to the computing device 500.

In addition, the font management system 502 can operate in connection with one or more applications to display fonts on the computing device 500. For example, in one or more embodiments, the font management system 502 provides fonts to a word processing application such as ADOBE® ACROBAT®, ADOBE® INDESIGN®, or another word processing application. In other embodiments, the font management system 502 provides fonts to a design application such as ADOBE® ILLUSTRATOR®.

As illustrated in FIG. 5, the font recognition system 504 includes various components. For example, the font recognition system 504 includes a font manager 506, a font triplet generator 508, a font recognition neural network 510, a font identifier 522, and a font database 524 that includes a training font set 526 and font feature vectors 528. Each of these components is described below in turn.

The font manager 506 can store, receive, detect, install, order, and/or organize fonts within the computing device 500. For example, in one or more embodiments, the font manager 506 stores a set of fonts on the computing device 500. In some embodiments, the font manager 506, in connection with the font management system 502, maintains fonts within the font database 524. For example, the font manager 506 maintains a set of fonts (e.g., Japanese fonts) that a user can employ in an electronic document. In an additional example, the font manager 506 maintains the training font set 526 (e.g., labeled text images of Japanese fonts). In various embodiments, the font manager 506 can identify and access additional fonts not stored or located on the computing device 500. For instance, the font manager 506 maintains fonts on the computing device 500 corresponding to multiple languages.

The font triplet generator 508 can generate font triplets used to train the font recognition neural network 510. For example, the font triplet generator 508 generates font triplets that include an anchor text image, a positive text image, and a negative text image, as previously described. In this manner, the font triplet generator 508 can generate a font triplet that includes a positive pair between the anchor and the positive text images, and a negative pair between the anchor and the negative text image. Additional description regarding generating font triplets is provided above in connection with FIG. 4.

The font recognition system 504 includes the font recognition neural network 510. As shown the font recognition neural network 510 includes convolutional layers 512, higher layers 514, and loss layers 516. The loss layers 516 include a font classification loss 518 and a triplet loss 520. As described above, the font recognition system 504 employs a machine-learning algorithm to jointly train the font recognition neural network 510. In particular, the font recognition system 504 employs the training font set 526 to initially train layers of the font recognition neural network 510 using the font classification loss 518, then further train the layers of the font recognition neural network 510 by adding a triplet neural network that includes the triplet loss 520, as described above in detail. For example, the font recognition system 504 trains the font recognition neural network by minimizing the combined loss between the font classification loss 518 and the triplet loss 520 using end-to-end learning and back propagation.

Using the font recognition neural network 510, the font recognition system 504 generates a set of feature vectors 528, which are stored in the font database 524. In one or more embodiments, the font recognition system 504 generates the font feature vectors 528 for each of the fonts in the training font set 526 as part of training the font recognition neural network 510. In additional and/or alternative embodiments, the font recognition system 504 generates and stores font feature vectors 528 corresponding to a different set of fonts (than the training font set), such as fonts stored on the computing device 500.

As shown, the font recognition system 504 includes the font identifier 522. The font identifier 522 can receive input fonts within input text images and identify the input font using the trained font recognition neural network 510. In particular, the font identifier 522 identifies one or more font feature vectors for input text within an input text image by delivering the input text image into the trained font recognition neural network 510. In addition, the font identifier 522 compares the one or more feature vectors of the input font to the font feature vectors 528, as explained earlier, to identify the font for the input font (e.g., to generate a font probability vector). Further, the font identifier 522 provides the identified font, for example, to the user that submitted the input text image.

Each of the components 506-528 of the font recognition system 504 can include software, hardware, or both. For example, the components 506-528 can include one or more instructions stored on a computer-readable storage medium and executable by processors of one or more computing devices, such as a client device or server device. When executed by the one or more processors, the computer-executable instructions of the font recognition system 504 can cause the computing device(s) to perform the feature learning methods described herein. Alternatively, the components 506-528 can include hardware, such as a special-purpose processing device to perform a certain function or group of functions. Alternatively, the components 506-528 of the font recognition system 504 can include a combination of computer-executable instructions and hardware.

Furthermore, the components 506-528 of the font recognition system 504 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 506-528 may be implemented as a stand-alone application, such as a desktop or mobile application. Furthermore, the components 506-528 may be implemented as one or more web-based applications hosted on a remote server. The components 506-528 may also be implemented in a suite of mobile device applications or "apps." To illustrate, the components 506-528 may be implemented in an application, including but not limited to ADOBE® TYPEKIT®, ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

Figure 6:
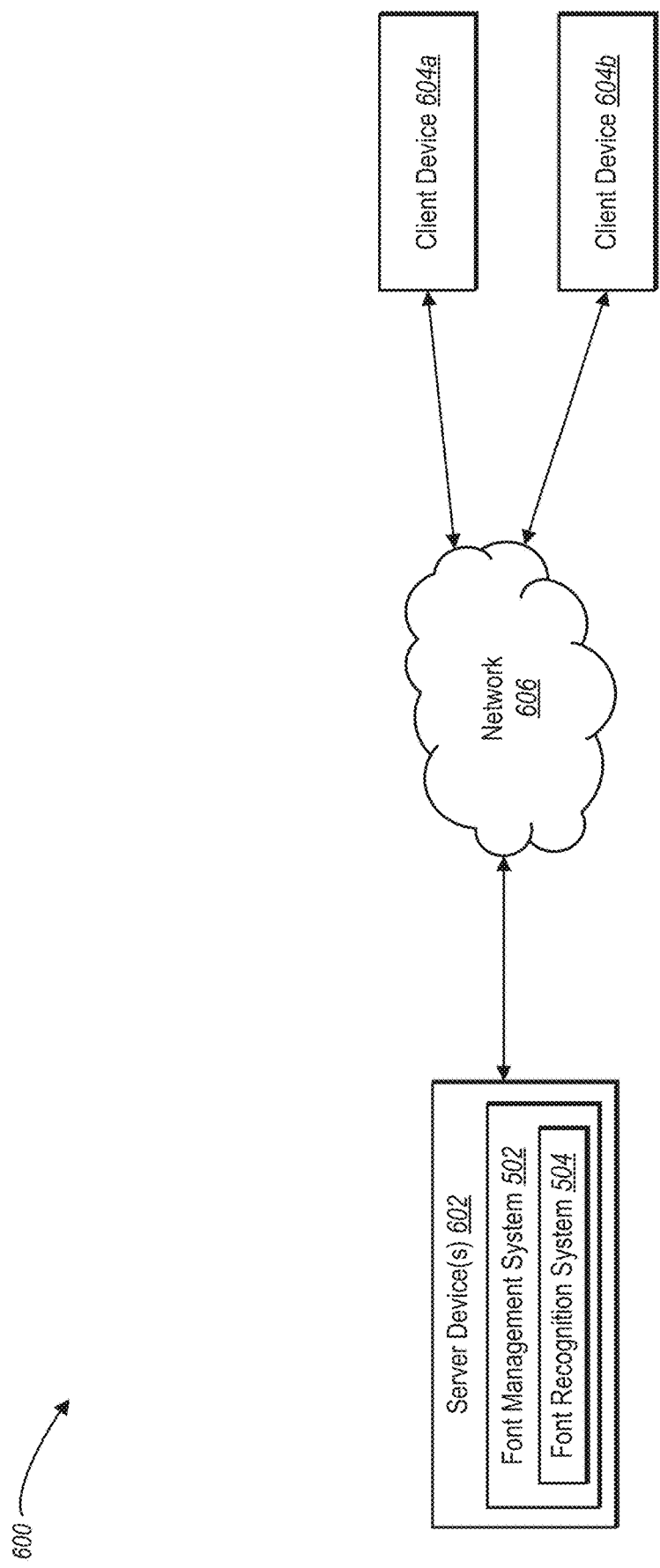
FIG. 6 illustrates a schematic diagram of an exemplary environment in which the font recognition system may be implemented in accordance with one or more embodiments.

FIG. 6 illustrates a schematic diagram of an environment 600 in which the font recognition system 504 may be implemented in accordance with one or more embodiments. In one or more embodiments, the environment 600 includes various computing devices including server device(s) 602 and one or more client devices 604a, 604b. In addition, the environment 600 includes a network 606. The network 606 may be any suitable network over which the computing devices can communicate. Example networks are discussed in more detail below with regard to FIG. 11.

As illustrated in FIG. 6, the environment 600 includes the server device(s) 602, which may comprise any computing device, such as one or more of the computing devices described below in relation to FIG. 11. In addition, the server device(s) 602 includes the font management system 502 and the font recognition system 504, which are described previously. For example, as described above, the font recognition system 504 can train and apply a font recognition neural network to accurately identify a font (e.g., Japanese font) used in a text image.

In addition, the environment 600 includes the one or more client devices 604a, 604b. The client devices 604a, 604b may comprise any computing device, such as the computing device described below in relation to FIG. 11. As described above, the one or more client devices 604a, 604b can employ the trained font recognition neural network to identify a font within an input text image.

As illustrated, in one or more embodiments, the server device(s) 602 can include all, or a portion of, the font recognition system 504. In particular, the font recognition system 504 can comprise an application running on the server device(s) 602 or a portion of a software application that can be downloaded from the server device(s) 602. For example, the font recognition system 504 can include a web hosting application that allows a client device 604a to interact with content hosted on the server device(s) 602. To illustrate, in one or more embodiments of the environment 600, the client device 604a accesses a web page supported by the server device(s) 602. In particular, the client device 604a can run an application to allow a user to access, view, select, and/or identify a font from a text image within a web page or website hosted at the server device(s) 602 (e.g., a web page enables a user to provide a text image that includes input font, and receive, from the sure, identification of the input font).

Although FIG. 6 illustrates a particular arrangement of the server device(s) 602, the client devices 604a, 604b and the network 606, various additional arrangements are possible. For example, while FIG. 6 illustrates the one or more client devices 604a, 604b communicating with the server device(s) 602 via the network 606, in one or more embodiments a single client device may communicate directly with the server device(s) 602, bypassing the network 606.

Similarly, although the environment 600 of FIG. 6 is depicted as having various components, the environment 600 may have additional or alternative components. For example, the font recognition system 504 can be implemented on multiple computing devices. In particular, the font recognition system 504 may be implemented in whole by the server device(s) 602 or the font recognition system 504 may be implemented in whole by the client device 604a. Alternatively, the font recognition system 504 may be implemented across multiple devices or components (e.g., utilizing the server device(s) 602 and the one or more client devices 604a, 604b).

Figure 7:
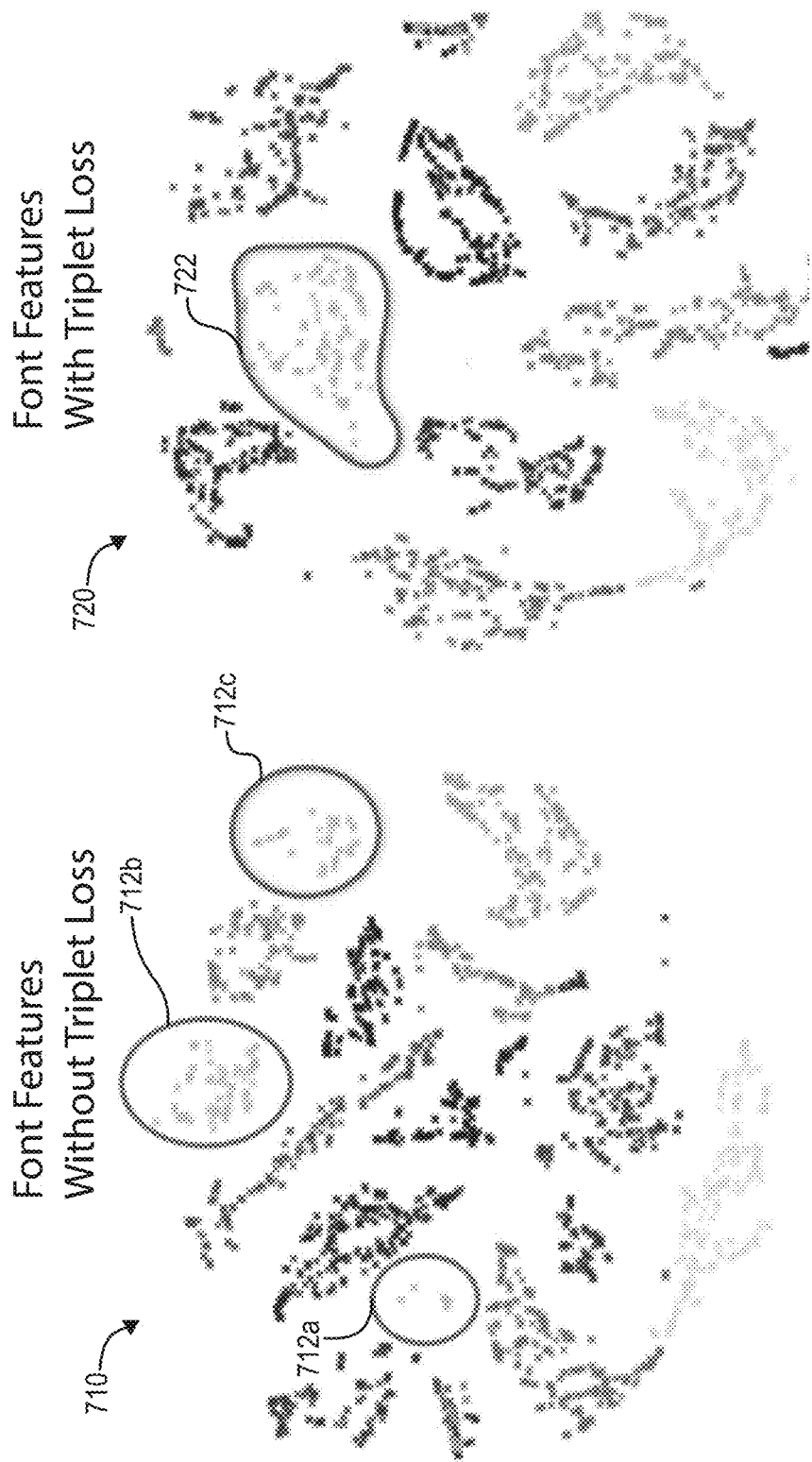
FIG. 7 illustrates a comparison of font feature maps between a recent system and one or more embodiments of the font recognition system disclosed herein.
Figure 8:
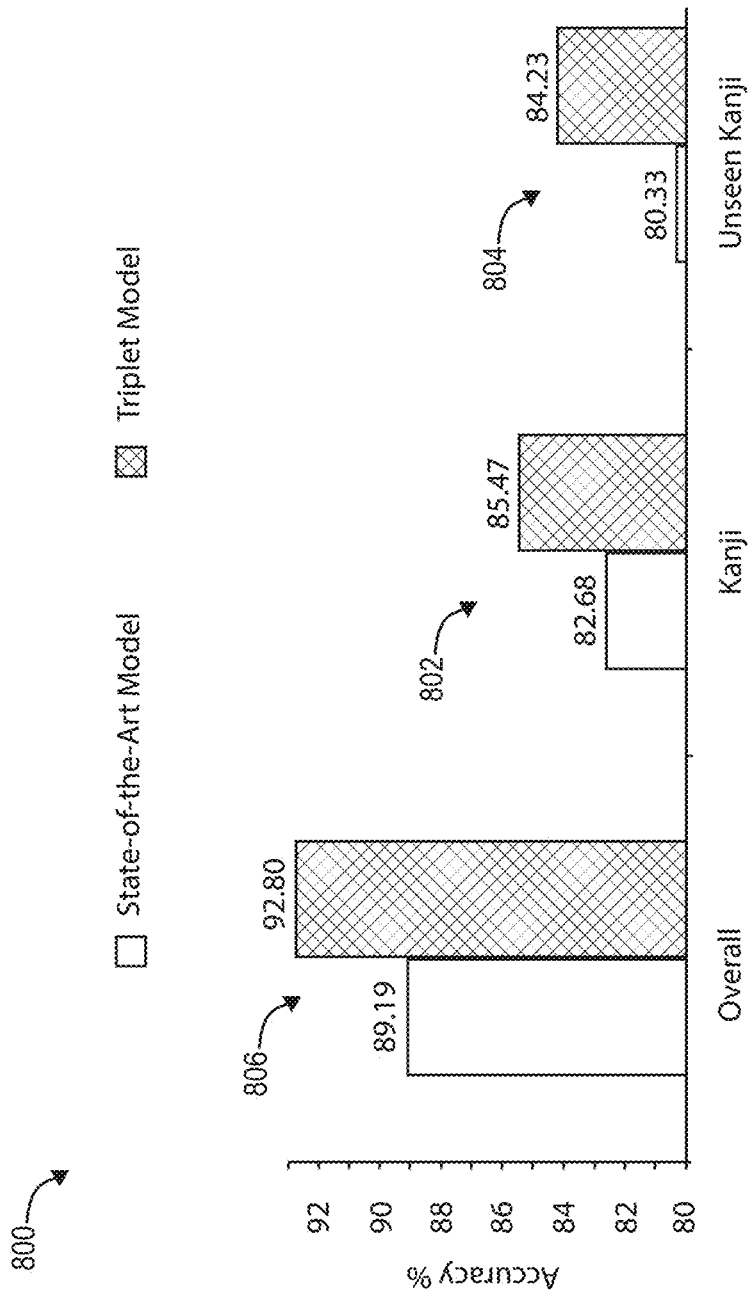
FIG. 8 illustrates a bar chart comparing the accuracy of font recognition between a recent system and one or more embodiments of the font recognition system disclosed herein.

Turning now to FIG. 7 and FIG. 8, additional detail is provided with respect to evaluating the embodiments of the font recognition system. In particular, FIG. 7 illustrates a comparison of font feature maps between a recent system and one or more embodiments of the font recognition system disclosed herein. In addition, FIG. 8 illustrates a bar chart comparing the accuracy of font recognition between a recent system and one or more embodiments of the font recognition system disclosed herein.

FIG. 7 illustrates a two-dimensional visual comparison between a first font feature map 710 of font features trained without the triplet loss (e.g., without employing the triplet neural network) and a second font feature map 720 of font features trained with the triplet loss. More specifically, the font feature maps in FIG. 7 provide a two-dimensional visualization of font features from the last fully connected layer of a neural network for ten (10) fonts. A T-SNE tool was used to obtain the font feature maps of the last fully connected layers of each respective neural network.

The first font feature map 710 represents the recent or state-of-the-art font classification systems and the second font feature map 720 represents improvements provided by the font recognition system disclosed herein. As shown in the first font feature map 710, the same font is clustered in multiple locations throughout the feature map. To illustrate, the three areas indicated by the circles 712a, 712b, and 712c show clusters of the same font. In contrast, the second font feature map 720 clusters the same font in a single area 722.

The font recognition system disclosed herein performs better than recent systems, in part, because the triplet neural network described above results in a more discriminative font recognition neural network. Further, the trained font recognition neural network is more generalized such that the negative side-effects of glyph content (e.g., intra-class variances) is removed.

As further shown in the second font feature map 720, the total number of clusters is reduced because the same font features are grouped into a single group as opposed to multiple groups. For example, the first font feature map 710 includes around 18 font clusters while the second font feature map 720 includes around 12 clusters. Thus, fewer font clusters result in higher accuracy when identifying fonts.

To illustrate, as described above, the feature vector of an input font is compared to feature vectors of known fonts. Accordingly, if the font feature map includes the feature vectors of known fonts, the font recognition system plots the feature vector of the input font within the font feature map to determine which cluster of feature vectors the feature vector of the input font most closely aligns. Because the clusters of the second font feature map 720 are better defined and concentrated than the first font feature map 710, the font recognition system described herein will better identify and provide the input font.

As mentioned above, FIG. 8 shows a bar chart 800 comparing the accuracy of font recognition between a recent system and one or more embodiments of the font recognition system disclosed herein. For instance, the bar chart 800 shows an evaluation between the effectiveness of a recent state-of-the-art system (shown in white) and embodiments of the font recognition system described herein (shown in crosshatch).

Specifically, the bar chart 800 shows the accuracy percentage of test data (e.g., input text images) that a trained neural network correctly recognizes. As shown, the bar chart 800 includes a first comparison 802 for input text images of Japanese Kanji fonts that have the same font included in the training font set used to train a neural network (i.e., "Kanji"). In addition, the bar chart 800 includes a second comparison 804 for input text images of Japanese Kanji fonts not included in the training font set (i.e., "Unseen Kanji"). Further, the bar chart 800 includes a third comparison 806 that combines the first two comparisons.

In each of the comparisons, the font recognition system described herein outperforms the recent system. As illustrated, the font recognition system described herein improves the overall accuracy around 3.6% points, which is a significant improvement. The font recognition system described herein particularly outperforms the recent system with respect to the unseen Kanji in the second comparison 804, indicating that the font recognition system described herein better generalizes than the recent system. As mentioned above, the font recognition system described herein improves generalization and better identifies unseen fonts through employing a triplet neural network when training the font recognition neural network. Stated differently, the font recognition system described herein employs triplet supervision to better discriminate against fonts while remaining agnostic toward glyph content.

As a note, FIG. 8 shows a comparison between the font recognition system described herein and a recent state-of-the-art font classification system. When compared to conventional font classification systems, the font recognition system described herein further outperforms these conventional systems. As mentioned above, conventional systems poorly perform font classification with fonts that includes intra-class variances, such as Japanese fonts.

FIGS. 1-8, the corresponding text, and the examples provide a number of different methods, systems, devices, and non-transitory computer-readable media of the font recognition system. In addition to the foregoing, one or more embodiments can also be described in terms of flowcharts comprising acts for accomplishing a particular result. For example, FIG. 9 and FIG. 10 may be performed with more or fewer acts. Further, the acts may be performed in differing orders. Additionally, the acts described herein may be repeated or performed in parallel with one another or parallel with different instances of the same or similar acts.

Figure 9:
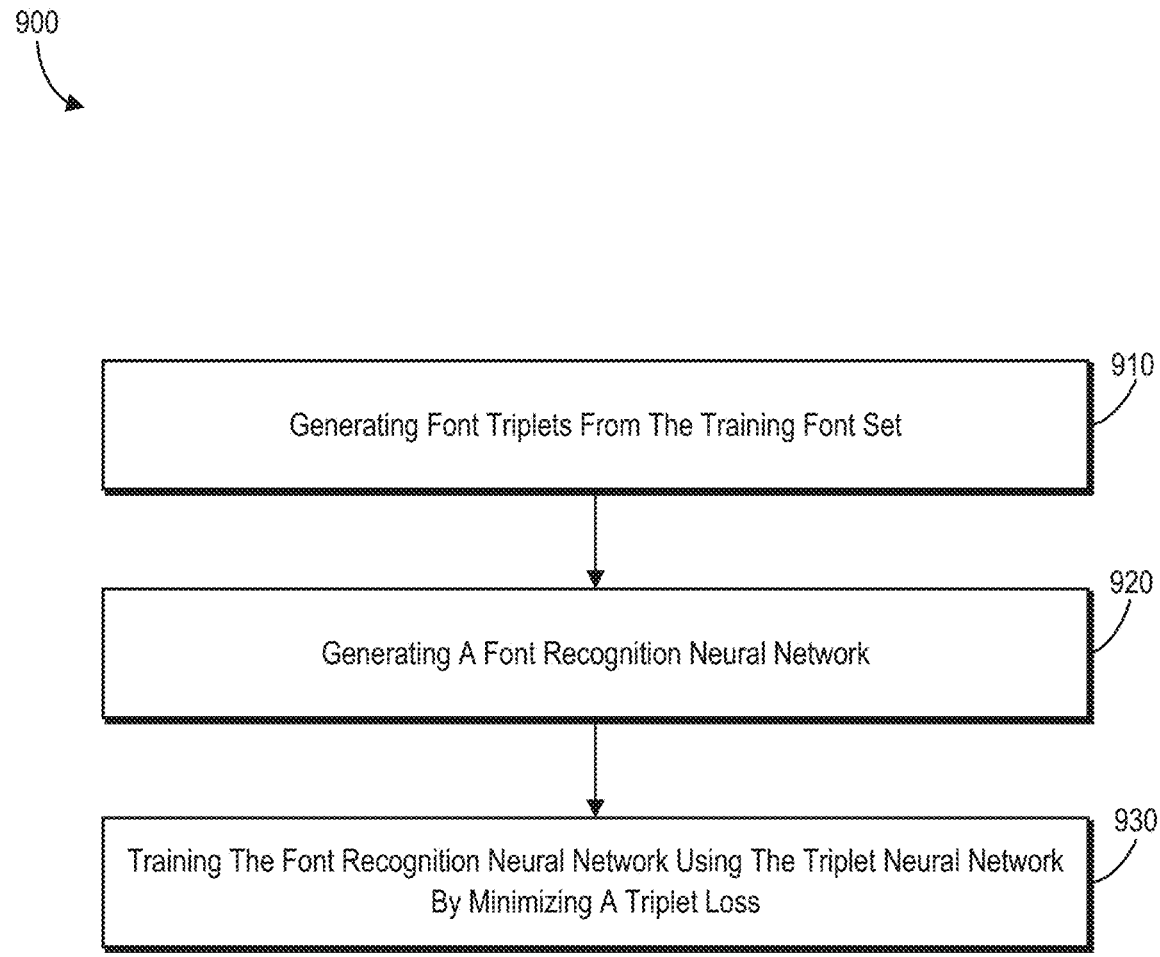
FIG. 9 illustrates a flowchart of a series of acts for training a font recognition neural network to classify digital fonts using triplet loss in accordance with one or more embodiments.

As mentioned, FIG. 9 illustrates a flowchart of a series of acts 900 for training a font recognition neural network to classify digital fonts using triplet loss in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

In one or more embodiments, the series of acts 900 is implemented on one or more computing devices, such as the computing device 500 or the server device(s) 602. In addition, in some embodiments, the series of acts 900 is implemented in a digital environment for creating or editing electronic documents. For example, the series of acts 900 is implemented on a computing device having memory that stores a training font set that includes a plurality of text images, where the text images include text of various digital fonts. In some embodiments, the training font set of text images include Japanese font glyphs.

The series of acts 900 includes an act 910 of generating font triplets from a training font set. In particular, the act 910 can involve generating a plurality of font triplets based on the training font set, where each font triplet includes an anchor text image, a positive text image, and a negative text image. In some embodiments, the act 910 includes generating, for each font triplet the anchor text image with a first text in a first font, generating the positive text image with a second text in the first font where the second text differs from the first text, and generating the negative text image including the first text in a second font where the second font differs from the first font. In one or more embodiments, the act 910 includes adding noise, blur, rotations, or shading to one of the anchor text image, the positive text image, or the negative text image with a generated font triplet.

As shown, the series of acts 900 also includes an act 920 of generating a font recognition neural network. In particular, the act 920 can involve generating a font recognition neural network configured to classify digital fonts. In one or more embodiments, the font recognition neural network is a convolutional neural network that employs a font classification loss (such as a softmax loss). Additionally, act 920 can involve generating a triplet neural network that employs a hinge loss function.

As shown, the series of acts 900 also includes an act 930 of training the font recognition neural network using the triplet neural network by minimizing a triplet loss. In various embodiments, the triplet loss seeks to minimize a distance between feature vectors for positive text images and feature vectors of anchor text images while simultaneously seeking to increase a distance between feature vectors for negative text images and the feature vectors of the anchor text images. In one or more embodiments, the act 930 includes training the font recognition neural network by jointly minimizing the triplet loss and a font classification loss.

The series of acts 900 can also include a number of additional acts. In one or more embodiments, the series of acts 900 includes the acts of minimizing a softmax loss function at the same time as minimizing a hinge loss function of the triplet neural network based on end-to-end learning and back propagation. In one or more embodiments, the convolutional neural network of the font classification loss generates parameters shared by the three duplicate feed-forward neural networks of the triplet neural network. For example, in various embodiments, each of the three duplicate feed-forward neural networks is a copy of the initially trained font recognition neural network, but receives a different input text image from a triplet.

In some embodiments, the series of acts 900 includes the acts of receiving an input text image including an input digital font, generating a feature vector for the input font using the trained font recognition neural network, generating a font probability vector for the input digital font based on comparing the feature vector of the input digital font to feature vectors of known digital fonts generated using the font recognition neural network, identify the input digital font based on the font probability vector, and presenting the identified input digital font to a computing device or a user. In some embodiments, the input text image includes text not included in the training font set.

Figure 10:
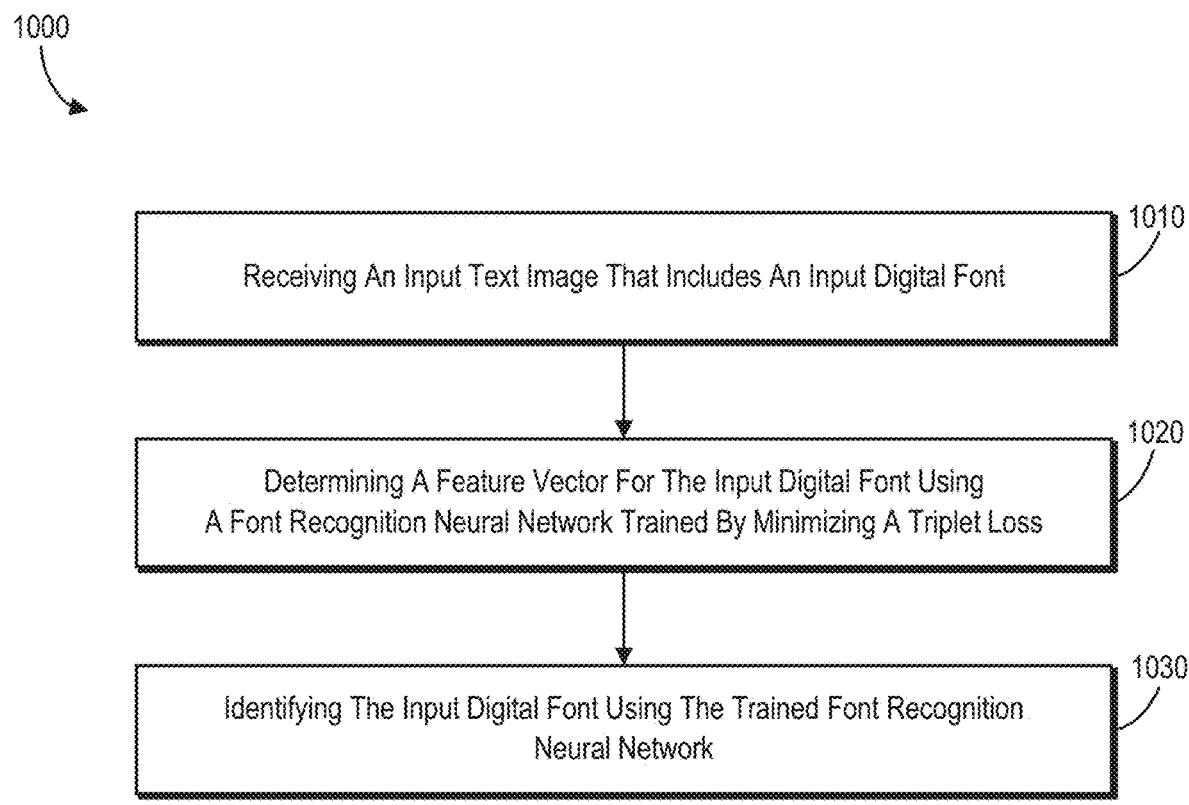
FIG. 10 illustrates a flowchart of a series of acts for identifying an input font in an input image using the trained font recognition neural network in accordance with one or more embodiments.

As mentioned previously, FIG. 10 illustrates a flowchart of a series of acts 1000 for identifying an input font in an input image using the trained font recognition neural network in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In one or more embodiments, a system can perform the acts of FIG. 10. In some embodiments, the series of acts 1000 is implemented by a computing system on one or more computing devices, such as the computing device 500 or the server device(s) 602.

As shown, the series of acts 1000 includes an act 1010 of receiving an input text image that includes an input digital font. In one or more embodiments, the act 1010 includes receiving the input text image from a user and/or an application. In some embodiments, the input digital font and known digital fonts, described below, include Japanese digital fonts.

The series of acts 1000 also includes an act 1020 of determining a feature vector for the input digital font using a font recognition neural network trained by jointly minimizing a triplet loss and a font classification loss. In particular, the triplet loss seeks to minimize the distance between feature vectors for positive text images and feature vectors of anchor text images while simultaneously seeking to increase the distance between feature vectors for negative text images and the feature vectors of the anchor text images. In some embodiments, the font recognition neural network is a convolutional neural network, the font classification loss employs a softmax loss function that receives output from the convolutional neural network, the triplet neural network includes three duplicate feed-forward neural networks based on the font recognition neural network, and the triplet loss employs a hinge loss function that receives output from the triplet neural network.

In addition, the series of acts 1000 includes an act 1030 of identifying the input digital font using the trained font recognition neural network. In particular, the act 1030 can involve identifying the input digital font by comparing the feature vector of the input digital font to feature vectors of known digital fonts generated using the trained font recognition neural network. In some embodiments, the act 1030 includes comparing the feature vector of the input digital font to averaged feature representations corresponding to each of the known digital fonts. In additional embodiments, the act 1030 includes selecting the known digital font having an averaged feature representation that has a smallest distance from the feature vector of the input digital font.

The series of acts 1000 can also include a number of additional acts. In one or more embodiments, the series of acts 1000 includes the act of presenting the identified input digital font to a user. In various embodiments, the input text image includes text not included in a training font set associated with the known digital fonts.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the font recognition system to jointly train and employ a font recognition neural network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
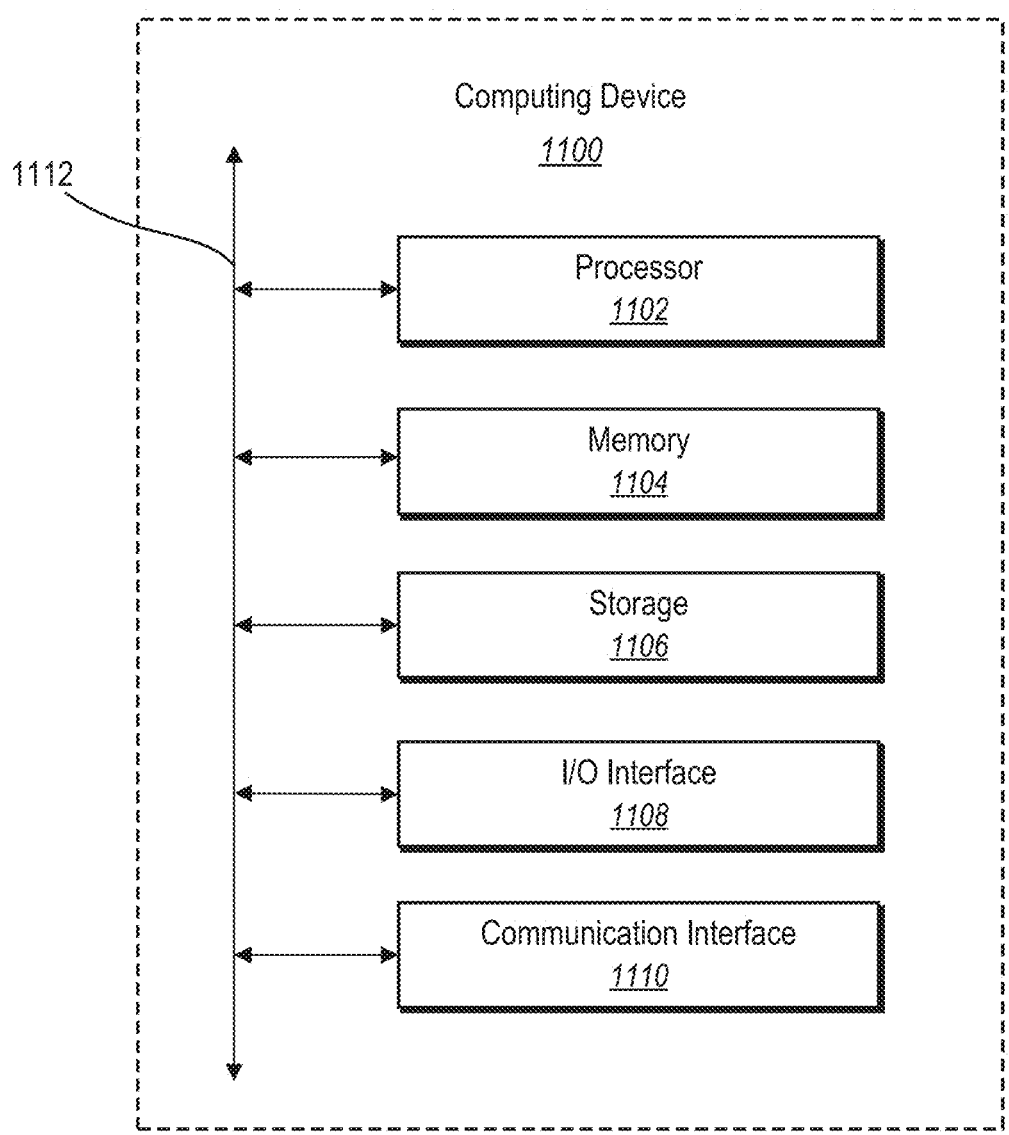
FIG. 11 illustrates a block diagram of an exemplary computing device for implementing one or more embodiments of the present disclosure.

FIG. 11 illustrates a block diagram of an exemplary computing device 1100 that may be configured to perform one or more of the processes described above. One will appreciate that one or more computing devices, such as the computing device 1100 may represent the computing devices described above (e.g., computing device 500, server device(s) 602, and client devices 604a-b). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output ("I/O") interfaces 1108, and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system for training a neural network to classify digital fonts using triplet loss comprising:
    a memory comprising:
        a training font set comprising a plurality of text images, the text images comprising text of various digital fonts;
    at least one processor; and
    at least one non-transitory computer-readable storage medium storing instructions that, when executed by the at least one processor, cause the system to:
        generate a plurality of font triplets based on the training font set, each font triplet comprising an anchor text image, a positive text image, and a negative text image;
        generate a font recognition neural network configured to classify digital fonts; and
        train the font recognition neural network by minimizing a triplet loss, wherein the triplet loss seeks to minimize a distance between feature vectors for positive text images and feature vectors of anchor text images while simultaneously seeking to increase a distance between feature vectors for negative text images and the feature vectors of the anchor text images.

2. The system of claim 1, wherein the plurality of text images comprises images of Japanese font glyphs.

3. The system of claim 1, further comprising instructions that, when the at least one processor causes the system to train the font recognition neural network by generating a triplet neural network that shares parameters with the font recognition neural network.

4. The system of claim 3, further comprising instructions that, when the at least one processor causes the system to generate the plurality of font triplets by generating, for each font triplet:
    the anchor text image comprising a first text in a first font;
    the positive text image comprising a second text in the first font, the second text differing from the first text; and
    the negative text image comprising the first text in a second font, the second font differing from the first font.

5. The system of claim 4, further comprising instructions that, when executed by the at least one processor, cause the system to add noise, blur, rotations, or shading to one of the anchor text image, the positive text image, or the negative text image.

6. The system of claim 3, further comprising instructions that, when the at least one processor causes the system to train the font recognition neural network by jointly minimizing the triplet loss and a font classification loss.

7. The system of claim 6, wherein:
    the font recognition neural network is a convolutional neural network;
    the font classification loss employs a softmax loss function that a receives output from the convolutional neural network;
    the triplet neural network comprises three duplicate feed-forward neural networks based on the font recognition neural network; and
    the triplet loss employs a hinge loss function that receives output from the triplet neural network.

8. The system of claim 7, further comprising instructions that, when executed by the at least one processor, cause the system to minimize the softmax loss function at the same time as minimizing the hinge loss function of the triplet neural network based on end-to-end learning and back propagation.

9. The system of claim 7, wherein the hinge loss function comprises a margin that distinguishes the distance between feature vectors for the positive text images and the feature vectors of anchor text images from the distance between feature vectors for the negative text images and the feature vectors of the anchor text images.

10. The system of claim 1, further comprising instructions that, when executed by the at least one processor, cause the system to:
receive an input text image comprising an input digital font;
generate a feature vector for the input digital font using the trained font recognition neural network;
generate a font probability vector for the input digital font based on comparing the feature vector of the input digital font to feature vectors of known digital fonts generated using the font recognition neural network;
identify the input digital font based on the font probability vector; and
present the identified input digital font.

11. The system of claim 10, wherein the input text image comprises text not included in the training font set.

12. A non-transitory computer-readable medium storing instructions that, when executed by at least one processor, cause a computer system to:
receive an input text image comprising an input digital font;
determine a feature vector for the input digital font using a font recognition neural network trained by jointly minimizing a triplet loss and a font classification loss, wherein the triplet loss seeks to minimize a distance between feature vectors for positive text images and feature vectors of anchor text images while simultaneously seeking to increase a distance between feature vectors for negative text images and the feature vectors of the anchor text images; and
identify the input digital font by comparing the feature vector of the input digital font to feature vectors of known digital fonts generated using the font recognition neural network.

13. The non-transitory computer-readable medium of claim 12, wherein the input digital font and the known digital fonts comprise Japanese digital font.

14. The non-transitory computer-readable medium of claim 12, further comprising instructions that, when executed by the at least one processor, cause the computer system to present the identified input digital font to a user.

15. The non-transitory computer-readable medium of claim 12, wherein the input text image comprises text not included in a training font set associated with the known digital fonts.

16. The non-transitory computer-readable medium of claim 12, wherein the instructions further cause the computer system to identify the input digital font by comparing the feature vector of the input digital font to averaged feature representations corresponding to each of the known digital fonts.

17. The non-transitory computer-readable medium of claim 12, wherein the instructions further cause the computer system to identify the input digital font by selecting the known digital font having an averaged feature representation that has a smallest distance from the feature vector of the input digital font.

18. In a digital medium environment for creating or editing electronic documents, a computer-implemented method of searching for and identifying images of digital fonts, comprising:
performing a step for determining a plurality of font triplets from a plurality of text images, the text images comprising various digital fonts; and
performing a step for training a font recognition neural network using a triplet loss, wherein:
the triplet loss based on the plurality of font triplets; and
the triplet loss seeks to minimize a distance between feature vectors for positive text images and feature vectors of anchor text images while simultaneously seeking to increase a distance between feature vectors for negative text images and the feature vectors of the anchor text images.

19. The method of claim 18, wherein performing the step for training the font recognition neural network using the triplet loss comprises jointly minimizing the triplet loss and a font classification loss.

20. The method of claim 19, further comprising:
receiving an input image of text comprising an input digital font; and
performing a step for identifying the input digital font using the trained font recognition neural network.

* * * * *